(12) United States Patent
Hawkes et al.

(10) Patent No.: US 8,121,296 B2
(45) Date of Patent: Feb. 21, 2012

(54) METHOD AND APPARATUS FOR SECURITY IN A DATA PROCESSING SYSTEM

(75) Inventors: Philip Hawkes, Burwood (AU);
Gregory G. Rose, Mortlake (AU);
Raymond T. Hsu, San Diego, CA (US);
Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 633 days.

(21) Appl. No.: 09/933,972

(22) Filed: Aug. 20, 2001

(65) Prior Publication Data

US 2002/0141591 A1    Oct. 3, 2002

Related U.S. Application Data

(60) Provisional application No. 60/279,970, filed on Mar. 28, 2001.

(51) Int. Cl.
*H04L 9/08* (2006.01)
*H04L 9/16* (2006.01)
*H04N 7/16* (2006.01)

(52) U.S. Cl. ......... 380/283; 380/278; 380/286; 379/120

(58) Field of Classification Search ................ 713/171, 713/193, 194; 380/203, 210, 259, 273, 37, 380/281, 283, 278, 286; 379/120
See application file for complete search history.

(56) References Cited

U.S. PATENT DOCUMENTS

| | | | |
|---|---|---|---|
| 4,163,255 A | 7/1979 | Pires et al. | |
| 4,323,921 A | 4/1982 | Guillou | |
| 4,750,167 A | 6/1988 | Meyer et al. | |
| 4,870,408 A | 9/1989 | Zdunek et al. | |
| 4,881,263 A | 11/1989 | Herbison et al. | |
| 4,901,307 A | 2/1990 | Gilhousen et al. | |
| 4,924,513 A | 5/1990 | Herbison et al. | |
| 5,056,109 A | 10/1991 | Gilhousen et al. | |
| 5,101,501 A | 3/1992 | Gilhousen et al. | |
| 5,103,459 A | 4/1992 | Gilhousen et al. | |
| 5,117,457 A | 5/1992 | Comerford et al. | |
| 5,136,586 A | 8/1992 | Greenblatt et al. | |
| 5,150,412 A * | 9/1992 | Maru | 380/43 |
| 5,159,447 A | 10/1992 | Haskell et al. | |
| 5,164,988 A | 11/1992 | Matyas et al. | |
| 5,235,631 A | 8/1993 | Grube et al. | |

(Continued)

FOREIGN PATENT DOCUMENTS

CN    1281561 A    1/2001

(Continued)

OTHER PUBLICATIONS

Schneier, Bruce. Applied Cryptography, Second Edition, 1996 John Wiley & Sons, Inc., pp. 182-184.*

(Continued)

*Primary Examiner* — Michael Simitoski

(74) *Attorney, Agent, or Firm* — Michael DeHaemer, Jr.

(57) ABSTRACT

Method and apparatus for secure transmissions. Each user is provided a registration key. A long-time updated broadcast key is encrypted using the registration key and provided periodically to a user. A short-time updated key is encrypted using the broadcast key and provided periodically to a user. Broadcasts are then encrypted using the short-time key, wherein the user decrypts the broadcast message using the short-time key.

41 Claims, 15 Drawing Sheets

U.S. PATENT DOCUMENTS

| | | | |
|---|---|---|---|
| 5,237,612 A | 8/1993 | Raith | |
| 5,241,598 A | 8/1993 | Raith | |
| 5,253,294 A | 10/1993 | Maurer et al. | |
| 5,257,396 A | 10/1993 | Auld, Jr. et al. | |
| 5,325,357 A | 6/1994 | Kimoto et al. | |
| 5,351,087 A | 9/1994 | Christopher et al. | |
| 5,353,332 A | 10/1994 | Raith et al. | |
| 5,363,379 A | 11/1994 | Eckenrode et al. | |
| 5,365,572 A | 11/1994 | Saegusa et al. | |
| 5,369,784 A | 11/1994 | Nelson et al. | |
| 5,371,794 A | 12/1994 | Diffie et al. | |
| 5,404,563 A * | 4/1995 | Green et al. | 718/102 |
| 5,410,602 A | 4/1995 | Finkelstein et al. | |
| 5,412,655 A | 5/1995 | Yamada et al. | |
| 5,421,006 A | 5/1995 | Jablon et al. | |
| 5,448,568 A | 9/1995 | Delpuch et al. | |
| 5,467,398 A | 11/1995 | Pierce et al. | |
| 5,473,609 A | 12/1995 | Chaney | |
| 5,473,642 A | 12/1995 | Osawa | |
| 5,481,613 A | 1/1996 | Ford et al. | |
| 5,485,577 A | 1/1996 | Eyer et al. | |
| 5,504,773 A | 4/1996 | Padovani et al. | |
| 5,513,245 A | 4/1996 | Mizikovsky et al. | |
| 5,515,441 A | 5/1996 | Faucher et al. | |
| 5,537,474 A | 7/1996 | Brown et al. | |
| 5,565,909 A * | 10/1996 | Thibadeau et al. | 725/35 |
| 5,592,470 A | 1/1997 | Rudrapatna et al. | |
| 5,673,259 A | 9/1997 | Quick, Jr. | |
| 5,686,963 A | 11/1997 | Uz et al. | |
| 5,708,961 A | 1/1998 | Hylton et al. | |
| 5,729,540 A | 3/1998 | Wegrzyn | |
| 5,740,246 A | 4/1998 | Saito | |
| 5,748,736 A | 5/1998 | Mittra | |
| 5,751,707 A | 5/1998 | Voit et al. | |
| 5,751,725 A | 5/1998 | Chen et al. | |
| 5,758,068 A | 5/1998 | Brandt et al. | |
| 5,758,291 A | 5/1998 | Grube et al. | |
| 5,768,276 A | 6/1998 | Diachina et al. | |
| 5,774,496 A | 6/1998 | Butler et al. | |
| 5,778,059 A | 7/1998 | Loghmani et al. | |
| 5,778,069 A * | 7/1998 | Thomlinson et al. | 380/262 |
| 5,778,187 A | 7/1998 | Monteiro et al. | |
| 5,787,347 A | 7/1998 | Yu et al. | |
| 5,796,829 A * | 8/1998 | Newby et al. | 705/54 |
| 5,835,730 A | 11/1998 | Grossman et al. | |
| 5,850,444 A | 12/1998 | Rune et al. | |
| 5,850,445 A | 12/1998 | Chan et al. | |
| 5,870,474 A * | 2/1999 | Wasilewski et al. | 380/211 |
| 5,878,141 A | 3/1999 | Daly et al. | |
| 5,881,368 A | 3/1999 | Grob et al. | |
| 5,884,196 A | 3/1999 | Lekven et al. | |
| 5,887,252 A | 3/1999 | Noneman | |
| 5,909,491 A | 6/1999 | Luo et al. | |
| 5,923,649 A | 7/1999 | Raith | |
| 5,936,965 A | 8/1999 | Doshi et al. | |
| 5,940,507 A | 8/1999 | Cane et al. | |
| 5,946,316 A | 8/1999 | Chen et al. | |
| 5,956,404 A | 9/1999 | Schneier et al. | |
| 5,956,681 A | 9/1999 | Yamakita | |
| 5,970,072 A | 10/1999 | Gammenthaler, Jr. et al. | |
| 5,970,417 A | 10/1999 | Toyryla et al. | |
| 5,978,386 A | 11/1999 | Hamalainen | |
| 5,983,099 A | 11/1999 | Yao et al. | |
| 5,990,928 A | 11/1999 | Sklar et al. | |
| 5,991,400 A | 11/1999 | Kamperman | |
| 5,991,407 A | 11/1999 | Murto et al. | |
| 6,006,073 A | 12/1999 | Glauner et al. | |
| 6,018,360 A | 1/2000 | Stewart et al. | |
| 6,021,124 A | 2/2000 | Haartsen et al. | |
| 6,026,165 A | 2/2000 | Marino et al. | |
| 6,032,197 A | 2/2000 | Birdwell et al. | |
| 6,044,154 A | 3/2000 | Kelly et al. | |
| 6,047,071 A | 4/2000 | Shah | |
| 6,047,395 A | 4/2000 | Zook et al. | |
| 6,052,812 A | 4/2000 | Chen et al. | |
| 6,055,236 A | 4/2000 | Nessett et al. | |
| 6,055,314 A | 4/2000 | Spies et al. | |
| 6,058,289 A | 5/2000 | Gardner et al. | |
| 6,065,061 A | 5/2000 | Blahut et al. | |
| 6,067,290 A | 5/2000 | Paulraj et al. | |
| 6,073,122 A * | 6/2000 | Wool | 705/51 |
| 6,081,907 A | 6/2000 | Witty et al. | |
| 6,097,817 A | 8/2000 | Bilgic et al. | |
| 6,098,878 A | 8/2000 | Dent et al. | |
| 6,108,424 A | 8/2000 | Pitiot et al. | |
| 6,108,706 A | 8/2000 | Birdwell et al. | |
| 6,111,866 A | 8/2000 | Kweon et al. | |
| 6,128,389 A | 10/2000 | Chan et al. | |
| 6,128,490 A | 10/2000 | Shaheen et al. | |
| 6,148,010 A | 11/2000 | Sutton et al. | |
| 6,157,719 A * | 12/2000 | Wasilewski et al. | 380/210 |
| 6,172,972 B1 | 1/2001 | Birdwell et al. | |
| 6,185,430 B1 | 2/2001 | Yee et al. | |
| 6,195,546 B1 | 2/2001 | Leung et al. | |
| 6,199,161 B1 | 3/2001 | Ahvenainen et al. | |
| 6,201,961 B1 | 3/2001 | Schindall et al. | |
| 6,208,634 B1 | 3/2001 | Boulos et al. | |
| 6,230,024 B1 | 5/2001 | Wang et al. | |
| 6,233,234 B1 | 5/2001 | Curry et al. | |
| 6,233,341 B1 | 5/2001 | Riggins | |
| 6,240,091 B1 | 5/2001 | Ginzboorg et al. | |
| 6,253,069 B1 | 6/2001 | Mankovitz | |
| 6,253,326 B1 | 6/2001 | Lincke et al. | |
| 6,256,509 B1 | 7/2001 | Tanaka et al. | |
| 6,266,420 B1 | 7/2001 | Langford et al. | |
| 6,272,632 B1 | 8/2001 | Carman et al. | |
| 6,295,361 B1 | 9/2001 | Kadansky et al. | |
| 6,310,661 B1 | 10/2001 | Arsenault | |
| 6,314,095 B1 | 11/2001 | Loa | |
| 6,343,280 B2 | 1/2002 | Clark | |
| 6,345,307 B1 | 2/2002 | Booth | |
| 6,353,614 B1 | 3/2002 | Borella et al. | |
| 6,363,242 B1 | 3/2002 | Brown, Jr. et al. | |
| 6,363,480 B1 | 3/2002 | Perlman et al. | |
| 6,373,829 B1 | 4/2002 | Vilmur et al. | |
| 6,374,103 B1 | 4/2002 | Kamel et al. | |
| 6,377,810 B1 | 4/2002 | Geiger et al. | |
| 6,385,200 B1 | 5/2002 | Erami et al. | |
| 6,385,461 B1 | 5/2002 | Raith et al. | |
| 6,415,312 B1 | 7/2002 | Boivie | |
| 6,424,717 B1 | 7/2002 | Pinder et al. | |
| 6,424,947 B1 | 7/2002 | Tsuria et al. | |
| 6,434,367 B1 | 8/2002 | Kumar et al. | |
| 6,438,612 B1 | 8/2002 | Ylonen et al. | |
| 6,449,491 B1 | 9/2002 | Dailey et al. | |
| 6,463,155 B1 | 10/2002 | Akiyama et al. | |
| 6,473,419 B1 | 10/2002 | Gray et al. | |
| 6,473,858 B1 | 10/2002 | Shimomura et al. | |
| 6,477,377 B2 | 11/2002 | Backstrom et al. | |
| 6,490,259 B1 | 12/2002 | Agrawal et al. | |
| 6,502,140 B1 | 12/2002 | Boivie | |
| 6,507,590 B1 | 1/2003 | Terho et al. | |
| 6,510,515 B1 | 1/2003 | Raith | |
| RE38,007 E | 2/2003 | Tsukamoto et al. | |
| 6,519,266 B1 | 2/2003 | Manning et al. | |
| 6,523,069 B1 | 2/2003 | Luczycki et al. | |
| 6,529,740 B1 | 3/2003 | Ganucheau, Jr. et al. | |
| 6,536,041 B1 * | 3/2003 | Knudson et al. | 725/39 |
| 6,538,996 B1 | 3/2003 | West et al. | |
| 6,539,242 B1 | 3/2003 | Bayley | |
| 6,542,490 B1 | 4/2003 | Ahmadvand et al. | |
| 6,549,771 B2 | 4/2003 | Chang et al. | |
| 6,560,206 B1 | 5/2003 | Naden et al. | |
| 6,564,211 B1 | 5/2003 | Andreev et al. | |
| 6,567,914 B1 | 5/2003 | Just et al. | |
| 6,571,109 B1 | 5/2003 | Kim | |
| 6,574,211 B2 | 6/2003 | Padovani et al. | |
| 6,577,734 B1 * | 6/2003 | Etzel et al. | 380/277 |
| 6,577,848 B1 | 6/2003 | Gregg et al. | |
| 6,580,756 B1 | 6/2003 | Matsui et al. | |
| 6,598,203 B1 | 7/2003 | Tang et al. | |
| 6,600,745 B1 | 7/2003 | Chopping et al. | |
| 6,601,068 B1 | 7/2003 | Park et al. | |
| 6,603,857 B1 | 8/2003 | Batten-Carew et al. | |
| 6,606,706 B1 | 8/2003 | Li et al. | |
| 6,608,841 B1 | 8/2003 | Koodli | |
| 6,614,804 B1 | 9/2003 | McFadden et al. | |

| | | |
|---|---|---|
| 6,633,979 B1 | 10/2003 | Smeets et al. |
| 6,647,000 B1 | 11/2003 | Persson et al. |
| 6,654,384 B1 | 11/2003 | Reza et al. |
| 6,658,463 B1 | 12/2003 | Dillon et al. |
| 6,665,718 B1 | 12/2003 | Chuah et al. |
| 6,680,920 B1 | 1/2004 | Wan et al. |
| 6,690,795 B1 * | 2/2004 | Richards ............... 380/203 |
| 6,704,368 B1 | 3/2004 | Nefedov et al. |
| 6,704,369 B1 | 3/2004 | Kawasaki et al. |
| 6,711,182 B1 | 3/2004 | Gibbs et al. |
| 6,714,650 B1 * | 3/2004 | Maillard et al. ........ 380/231 |
| 6,714,784 B1 | 3/2004 | Forssell et al. |
| 6,721,805 B1 | 4/2004 | Bhagwat et al. |
| 6,725,459 B2 | 4/2004 | Bacon et al. |
| 6,728,226 B1 | 4/2004 | Naito |
| 6,731,936 B2 | 5/2004 | Chen et al. |
| 6,735,177 B1 | 5/2004 | Suzuki et al. |
| 6,751,218 B1 | 6/2004 | Hagirahim et al. |
| 6,760,602 B2 | 7/2004 | Tangorra et al. |
| 6,760,752 B1 | 7/2004 | Liu et al. |
| 6,763,025 B2 | 7/2004 | Leatherbury et al. |
| 6,765,909 B1 | 7/2004 | Sen et al. |
| 6,766,024 B1 | 7/2004 | Rix et al. |
| 6,775,303 B1 | 8/2004 | Rustad et al. |
| 6,781,999 B2 | 8/2004 | Eyuboglu et al. |
| 6,788,681 B1 | 9/2004 | Hurren et al. |
| 6,792,048 B1 | 9/2004 | Lee et al. |
| 6,798,791 B1 | 9/2004 | Riazi et al. |
| 6,801,508 B1 | 10/2004 | Lim et al. |
| 6,804,520 B1 | 10/2004 | Johansson et al. |
| 6,819,930 B1 | 11/2004 | Laroia et al. |
| 6,826,406 B1 | 11/2004 | Vialen et al. |
| 6,831,910 B1 | 12/2004 | Moon et al. |
| 6,832,314 B1 * | 12/2004 | Irvin ...................... 713/162 |
| 6,856,800 B1 | 2/2005 | Henry et al. |
| 6,862,684 B1 | 3/2005 | DiGiorgio |
| 6,870,923 B2 | 3/2005 | Yi et al. |
| 6,879,573 B1 | 4/2005 | Huo et al. |
| 6,879,690 B2 | 4/2005 | Faccin et al. |
| 6,882,850 B2 | 4/2005 | McConnell et al. |
| 6,882,860 B1 | 4/2005 | Kim |
| 6,885,874 B2 | 4/2005 | Grube et al. |
| 6,895,216 B2 | 5/2005 | Sato et al. |
| 6,898,285 B1 | 5/2005 | Hutchings et al. |
| 6,898,640 B1 | 5/2005 | Kurita |
| 6,915,272 B1 | 7/2005 | Zilliacus et al. |
| 6,918,035 B1 | 7/2005 | Patel et al. |
| 6,920,119 B2 | 7/2005 | Rinchiuso |
| 6,925,285 B2 | 8/2005 | Kim et al. |
| 6,944,763 B1 | 9/2005 | Asano et al. |
| 6,956,833 B1 | 10/2005 | Yukie et al. |
| 6,959,384 B1 | 10/2005 | Serret-Avila |
| 6,970,689 B2 | 11/2005 | Khorram |
| 6,978,143 B1 | 12/2005 | Vialen |
| 6,983,410 B2 | 1/2006 | Chen et al. |
| 6,987,982 B2 | 1/2006 | Willenegger et al. |
| 6,990,680 B1 | 1/2006 | Wugofski et al. |
| 7,016,351 B1 | 3/2006 | Farinacci et al. |
| 7,036,023 B2 | 4/2006 | Fries et al. |
| 7,039,180 B1 | 5/2006 | Issaa et al. |
| 7,046,672 B2 | 5/2006 | Liao et al. |
| 7,058,809 B2 | 6/2006 | White et al. |
| 7,069,436 B1 | 6/2006 | Akachi |
| 7,072,865 B2 | 7/2006 | Akiyama et al. |
| 7,079,502 B2 | 7/2006 | Yamano et al. |
| 7,079,523 B2 | 7/2006 | Nelson, Jr. et al. |
| 7,096,355 B1 | 8/2006 | Marvit et al. |
| 7,114,175 B2 | 9/2006 | Lahteenmaki et al. |
| 7,116,892 B2 | 10/2006 | Wajs |
| 7,133,353 B2 | 11/2006 | Sourour et al. |
| 7,134,019 B2 | 11/2006 | Shelest et al. |
| 7,177,424 B1 | 2/2007 | Furuya et al. |
| 7,181,620 B1 | 2/2007 | Hur |
| 7,185,362 B2 | 2/2007 | Hawkes et al. |
| 7,197,072 B1 | 3/2007 | Hsu et al. |
| 7,200,230 B2 | 4/2007 | Knauft et al. |
| 7,203,314 B1 | 4/2007 | Kahn et al. |
| 7,209,459 B2 | 4/2007 | Kangas et al. |
| 7,215,775 B2 | 5/2007 | Noguchi et al. |
| 7,237,108 B2 | 6/2007 | Medvinsky et al. |
| 7,239,704 B1 | 7/2007 | Maillard et al. |
| 7,266,687 B2 | 9/2007 | Sowa et al. |
| 7,278,164 B2 | 10/2007 | Raiz et al. |
| 7,280,660 B2 | 10/2007 | Salo et al. |
| 7,290,063 B2 | 10/2007 | Kalliokulju et al. |
| 7,301,968 B2 | 11/2007 | Haran et al. |
| 7,352,868 B2 | 4/2008 | Hawkes et al. |
| 7,376,963 B2 | 5/2008 | Kato et al. |
| 2001/0004761 A1 | 6/2001 | Zehavi et al. |
| 2001/0029581 A1 * | 10/2001 | Knauft ...................... 713/193 |
| 2001/0036200 A1 | 11/2001 | Nelson et al. |
| 2001/0036834 A1 | 11/2001 | Das et al. |
| 2001/0055298 A1 | 12/2001 | Baker et al. |
| 2002/0001386 A1 | 1/2002 | Akiyama |
| 2002/0002541 A1 | 1/2002 | Williams |
| 2002/0002674 A1 | 1/2002 | Grimes et al. |
| 2002/0010681 A1 | 1/2002 | Hillegass et al. |
| 2002/0014159 A1 | 2/2002 | Tatsumi et al. |
| 2002/0021809 A1 * | 2/2002 | Salo et al. ................ 380/239 |
| 2002/0023165 A1 | 2/2002 | Lahr |
| 2002/0071558 A1 | 6/2002 | Patel |
| 2002/0076195 A1 | 6/2002 | Nakajima et al. |
| 2002/0080887 A1 | 6/2002 | Jeong et al. |
| 2002/0091860 A1 | 7/2002 | Kalliokulju et al. |
| 2002/0091931 A1 | 7/2002 | Quick, Jr. et al. |
| 2002/0097722 A1 | 7/2002 | Liao et al. |
| 2002/0099949 A1 * | 7/2002 | Fries et al. ................ 713/200 |
| 2002/0102964 A1 | 8/2002 | Park |
| 2002/0112234 A1 * | 8/2002 | Bacon ...................... 725/25 |
| 2002/0152384 A1 | 10/2002 | Shelest et al. |
| 2002/0154781 A1 | 10/2002 | Sowa et al. |
| 2002/0164025 A1 | 11/2002 | Raiz et al. |
| 2002/0169724 A1 | 11/2002 | Moroney et al. |
| 2002/0176408 A1 | 11/2002 | Kangas et al. |
| 2002/0181423 A1 | 12/2002 | Chen et al. |
| 2003/0009669 A1 | 1/2003 | White et al. |
| 2003/0018891 A1 | 1/2003 | Hall et al. |
| 2003/0030581 A1 | 2/2003 | Roy |
| 2003/0031322 A1 | 2/2003 | Beckmann et al. |
| 2003/0035389 A1 | 2/2003 | Chen et al. |
| 2003/0039237 A1 | 2/2003 | Forslow et al. |
| 2003/0039361 A1 | 2/2003 | Hawkes et al. |
| 2003/0054807 A1 | 3/2003 | Hsu et al. |
| 2003/0064679 A1 | 4/2003 | Kim et al. |
| 2003/0070092 A1 | 4/2003 | Hawkes et al. |
| 2003/0072384 A1 | 4/2003 | Chen et al. |
| 2003/0087653 A1 | 5/2003 | Leung et al. |
| 2003/0101401 A1 | 5/2003 | Salvi et al. |
| 2003/0123669 A1 | 7/2003 | Koukoulidis et al. |
| 2003/0126440 A1 | 7/2003 | Go et al. |
| 2003/0134655 A1 | 7/2003 | Chen et al. |
| 2003/0135748 A1 | 7/2003 | Yamada et al. |
| 2003/0159029 A1 | 8/2003 | Brown et al. |
| 2003/0217057 A1 | 11/2003 | Kuroiwa et al. |
| 2004/0005860 A1 | 1/2004 | Kato et al. |
| 2004/0019787 A1 | 1/2004 | Shibata et al. |
| 2004/0022216 A1 | 2/2004 | Shi et al. |
| 2004/0095515 A1 | 5/2004 | Tajima et al. |
| 2004/0101138 A1 | 5/2004 | Revital et al. |
| 2004/0107350 A1 | 6/2004 | Wasilewski et al. |
| 2004/0120527 A1 | 6/2004 | Hawkes et al. |
| 2004/0131185 A1 | 7/2004 | Kakumer et al. |
| 2004/0132402 A1 | 7/2004 | Agashe et al. |
| 2004/0151317 A1 | 8/2004 | Hyyppa et al. |
| 2004/0199474 A1 | 10/2004 | Ritter |
| 2004/0202329 A1 | 10/2004 | Jung et al. |
| 2004/0243808 A1 | 12/2004 | Ishiguro et al. |
| 2004/0266391 A1 | 12/2004 | Hafren et al. |
| 2005/0008159 A1 | 1/2005 | Grilli et al. |
| 2005/0048963 A1 | 3/2005 | Kubler et al. |
| 2005/0055551 A1 | 3/2005 | Becker et al. |
| 2005/0063544 A1 | 3/2005 | Uusitalo et al. |
| 2005/0108563 A1 | 5/2005 | Becker et al. |
| 2005/0144550 A1 | 6/2005 | Jeon et al. |
| 2005/0165711 A1 | 7/2005 | Hamatsu |
| 2005/0216731 A1 | 9/2005 | Saito et al. |
| 2005/0238315 A1 | 10/2005 | Kataoka |
| 2005/0271210 A1 | 12/2005 | Soppera et al. |

| | | | |
|---|---|---|---|
| 2006/0078000 A1 | 4/2006 | Rinne et al. | |
| 2006/0168446 A1 | 7/2006 | Ahonen et al. | |
| 2006/0171540 A1 | 8/2006 | Lee et al. | |
| 2006/0242412 A1 | 10/2006 | Jung et al. | |
| 2007/0038610 A1 | 2/2007 | Omoigui | |
| 2007/0116282 A1 | 5/2007 | Hawkes et al. | |
| 2007/0214482 A1 | 9/2007 | Nguyen | |
| 2007/0280169 A1 | 12/2007 | Cam Winget | |

FOREIGN PATENT DOCUMENTS

| | | |
|---|---|---|
| EP | 0636963 A2 | 2/1995 |
| EP | 0702477 A2 | 3/1996 |
| EP | 748058 A2 | 12/1996 |
| EP | 813309 A2 | 12/1997 |
| EP | 854618 A2 | 7/1998 |
| EP | 924898 A1 | 6/1999 |
| EP | 928084 A2 | 7/1999 |
| EP | 951198 A2 | 10/1999 |
| EP | 0993128 A1 | 4/2000 |
| EP | 0999656 A1 | 5/2000 |
| EP | 1001570 A2 | 5/2000 |
| EP | 1024661 A2 | 8/2000 |
| EP | 1030484 A2 | 8/2000 |
| EP | 1032150 A2 | 8/2000 |
| EP | 1071296 A1 | 1/2001 |
| EP | 1075118 A2 | 2/2001 |
| EP | 1075123 A1 | 2/2001 |
| EP | 1098446 A2 | 5/2001 |
| EP | 1117204 A2 | 7/2001 |
| EP | 1134951 A2 | 9/2001 |
| EP | 1143635 A1 | 10/2001 |
| EP | 1185125 A1 | 3/2002 |
| EP | 1190526 A1 | 3/2002 |
| EP | 1213943 A1 | 6/2002 |
| EP | 1248188 A1 | 10/2002 |
| EP | 1374477 A1 | 1/2004 |
| EP | 2204940 | 7/2010 |
| GB | 2346512 A | 8/2000 |
| JP | 1101042 | 4/1989 |
| JP | 02090840 | 3/1990 |
| JP | 03179841 | 5/1991 |
| JP | 5216411 A | 8/1993 |
| JP | 06125554 | 5/1994 |
| JP | 7115414 | 5/1995 |
| JP | 7193569 | 7/1995 |
| JP | 7288798 | 10/1995 |
| JP | 9135478 A | 5/1997 |
| JP | 10023529 A | 1/1998 |
| JP | 10051380 A | 2/1998 |
| JP | 10063598 A | 3/1998 |
| JP | 10093547 | 4/1998 |
| JP | 10191459 | 7/1998 |
| JP | 10200536 A | 7/1998 |
| JP | 10214233 | 8/1998 |
| JP | 10240826 | 11/1998 |
| JP | 10512428 | 11/1998 |
| JP | 11127468 | 5/1999 |
| JP | 11136669 A | 5/1999 |
| JP | 11161167 | 6/1999 |
| JP | 11243569 | 9/1999 |
| JP | 11510668 T | 9/1999 |
| JP | 11313059 A | 11/1999 |
| JP | 11331070 A | 11/1999 |
| JP | 11331150 A | 11/1999 |
| JP | 11513853 | 11/1999 |
| JP | 11355460 A | 12/1999 |
| JP | 11355858 A | 12/1999 |
| JP | 2000078555 A | 3/2000 |
| JP | 2000115860 | 4/2000 |
| JP | 2000134193 | 5/2000 |
| JP | 2000137551 A | 5/2000 |
| JP | 2000165258 A | 6/2000 |
| JP | 2000196546 A | 7/2000 |
| JP | 2000196673 A | 7/2000 |
| JP | 2000244603 | 9/2000 |
| JP | 2000253459 A | 9/2000 |
| JP | 2000261374 A | 9/2000 |
| JP | 2000269959 | 9/2000 |
| JP | 2000511733 T | 9/2000 |
| JP | 000513519 | 10/2000 |
| JP | 2000287192 | 10/2000 |
| JP | 2000295541 | 10/2000 |
| JP | 2000324155 A | 11/2000 |
| JP | 2001007800 | 1/2001 |
| JP | 2001016253 A | 1/2001 |
| JP | 2001500327 | 1/2001 |
| JP | 200136941 | 2/2001 |
| JP | 2001036466 A | 2/2001 |
| JP | 2001045100 A | 2/2001 |
| JP | 2001053675 A | 2/2001 |
| JP | 2001077859 | 3/2001 |
| JP | 2001077859 A | 3/2001 |
| JP | 2001119340 A | 4/2001 |
| JP | 2001134193 | 5/2001 |
| JP | 2001136507 A | 5/2001 |
| JP | 2001177513 A | 6/2001 |
| JP | 2001177523 A | 6/2001 |
| JP | 2001177564 A | 6/2001 |
| JP | 2001512842 | 8/2001 |
| JP | 2001513587 | 9/2001 |
| JP | 2001333032 A | 11/2001 |
| JP | 2001522164 T | 11/2001 |
| JP | 2002026835 | 1/2002 |
| JP | 2002027417 | 1/2002 |
| JP | 2002064785 A | 2/2002 |
| JP | 2002505458 T | 2/2002 |
| JP | 2002506296 | 2/2002 |
| JP | 2002084470 A | 3/2002 |
| JP | 2002152194 | 5/2002 |
| JP | 2002514024 | 5/2002 |
| JP | 2002175505 | 6/2002 |
| JP | 20025211879 T | 7/2002 |
| JP | 2002216040 | 8/2002 |
| JP | 2002217894 | 8/2002 |
| JP | 2002232418 A | 8/2002 |
| JP | 2002232962 | 8/2002 |
| JP | 2002300152 | 10/2002 |
| JP | 2002319936 | 10/2002 |
| JP | 2002541685 | 12/2002 |
| JP | 2003503896 | 1/2003 |
| JP | 200352029 | 2/2003 |
| JP | 2003099327 A | 4/2003 |
| JP | 2003115832 | 4/2003 |
| JP | 2003124927 | 4/2003 |
| JP | 2003521843 T | 7/2003 |
| JP | 2003259284 A | 9/2003 |
| JP | 2003297015 A | 10/2003 |
| JP | 2003529963 | 10/2003 |
| JP | 2003339000 A | 11/2003 |
| JP | 2004048718 A | 2/2004 |
| JP | 200480663 | 3/2004 |
| JP | 2004532554 | 10/2004 |
| JP | 2004533174 | 10/2004 |
| JP | 2004343764 | 12/2004 |
| JP | 2005509367 | 4/2005 |
| JP | 2005512471 | 4/2005 |
| KR | 20000062153 | 10/2000 |
| KR | 200130725 | 4/2001 |
| KR | 20010030696 | 4/2001 |
| RU | 2073913 C1 | 2/1997 |
| RU | 2077113 C1 | 4/1997 |
| RU | 2091983 C1 | 9/1997 |
| RU | 2115249 C1 | 7/1998 |
| RU | 2147792 C1 | 4/2000 |
| RU | 2187205 C2 | 8/2002 |
| TW | 353841 | 3/1999 |
| TW | 373372 | 11/1999 |
| TW | 388158 | 4/2000 |
| TW | 420910 B | 2/2001 |
| TW | 448658 | 8/2001 |
| TW | 502190 | 9/2002 |
| TW | 508958 B | 11/2002 |
| WO | WO8607224 A1 | 12/1986 |
| WO | WO9611538 A2 | 4/1996 |
| WO | WO9715161 A1 | 4/1997 |
| WO | WO9716890 A2 | 5/1997 |
| WO | WO9717790 A1 | 5/1997 |
| WO | 9748212 | 12/1997 |

| | | |
|---|---|---|
| WO | WO9747094 | 12/1997 |
| WO | WO9810604 A1 | 3/1998 |
| WO | WO9825422 A1 | 6/1998 |
| WO | WO9857509 A2 | 12/1998 |
| WO | WO9922466 A1 | 5/1999 |
| WO | WO9922478 A1 | 5/1999 |
| WO | WO9930234 A1 | 6/1999 |
| WO | WO9944114 A1 | 9/1999 |
| WO | WO9949595 A1 | 9/1999 |
| WO | WO9959355 A2 | 11/1999 |
| WO | WO9962231 A1 | 12/1999 |
| WO | WO9966657 A1 | 12/1999 |
| WO | WO0002406 A2 | 1/2000 |
| WO | WO0004718 A1 | 1/2000 |
| WO | WO0008883 A1 | 2/2000 |
| WO | WO0013356 A1 | 3/2000 |
| WO | WO0033535 A1 | 6/2000 |
| WO | WO0036804 A1 | 6/2000 |
| WO | WO0048358 | 8/2000 |
| WO | WO0051308 A2 | 8/2000 |
| WO | WO0052880 A2 | 9/2000 |
| WO | WO0056018 A1 | 9/2000 |
| WO | WO0057601 A1 | 9/2000 |
| WO | WO0062476 | 10/2000 |
| WO | WO0062547 A1 | 10/2000 |
| WO | WO00/72609 A1 | 11/2000 |
| WO | WO00074311 | 12/2000 |
| WO | WO0074425 A1 | 12/2000 |
| WO | WO0076125 A1 | 12/2000 |
| WO | WO0078008 A1 | 12/2000 |
| WO | WO0079734 | 12/2000 |
| WO | WO0101630 A1 | 1/2001 |
| WO | WO01013358 | 2/2001 |
| WO | WO011046 A1 | 3/2001 |
| WO | WO0117163 | 3/2001 |
| WO | WO0119027 A2 | 3/2001 |
| WO | WO0120805 | 3/2001 |
| WO | WO0145443 | 6/2001 |
| WO | WO0150783 | 7/2001 |
| WO | WO0156232 | 8/2001 |
| WO | WO0247356 | 6/2002 |
| WO | WO0247407 A2 | 6/2002 |
| WO | WO02061572 A1 | 8/2002 |
| WO | WO02080449 A1 | 10/2002 |
| WO | WO02080454 A2 | 10/2002 |
| WO | WO02096150 | 11/2002 |
| WO | WO03001772 | 3/2003 |
| WO | WO03032573 A2 | 4/2003 |
| WO | WO03051072 | 6/2003 |
| WO | WO03063418 A1 | 7/2003 |
| WO | WO2004025895 A1 | 3/2004 |

OTHER PUBLICATIONS

LinuxGuruz. "Free On-Line Dictionary of Computing", § Internet Protocol, Dec. 2000.*
Jalali, A. et al. "Data Throughput of CDMA-HDR a High Efficiency-High Data Rate Personal Communication Wireless System", 2000 IEEE.*
Jou, Y. "Developments in Third Generation (3G) CDMA Technology", 2000 IEEE.*
IEEE. "IEEE Std. 802.11, Part 11 : Wireless LAN Medium Access Control (MAC) and Physical Layer (PHY) specifications", 1997, pp. 60-70.*
Menezes et al. "Handbook of Applied Cryptography" CRC Press Series on Discrete Mathematices and its Applications, Boca Raton, FL, CRC Press, US, 1997, pp. 551-553, 577-581.
S. Berkovits "How to Broadcast a Secret" Advances in Cryptology—Eurocrypt '91 Conference. Springer-Verlag, Apr. 11, 1991, pp. 535-541.
B.G. Marchent et al. "Intelligent Control of Mobile Multimedia Systems" Vehicular Technology Conference 1998. VTC 98, 48th IEEE Ottawa, Canada, May 18-21, 1998; New York, USA, May 18, 1998, pp. 2047-2051.
Greg Rose et al., "The Secure Real Time Transport Protocol," Internet Draft, Feb. 2001, pp. 1-26.
Bormann, C., et al., "Robust Header Compression (ROHC)," Internet Draft, Internet Engineering Task Force, Feb. 7, 2001, pp. 1-153, The Internet Society (ISOC), Reston, Virginia, USA.
Bormann, C., et al., "Robust Header Compression (ROHC): Framework and Four Profiles," Internet Draft, Internet Engineering Task Force, Feb. 26, 2001, pp. 1-153, The Internet Sbciety (ISOC), Reston, Virginia, USA.
Yamaguchi, S., "Realization of Multimedia Communications", Unix Magazine, Jun. 1, 1996, pp. 45-53, vol. 11, No. 6, ASCII Corporation, Tokyo, Japan.
Foldoc, "Spread-spectrum communications", definition, dated Aug. 8, 2001, from <http://foldoc.org/index.cgi?query=spread+spectrum>.
Pannetrat et al., Authenticating Real-Time Packet Streams And Multicasts, 2002 IEEE. Computers and Communications, 2002. Proceedings. ISCC 2002, Seventh International Symposium on, pp. 490-495.
Baugher et al: "The Secure Real Time Transport Protocol (Draft 09)" Internet Engineering Task Force, AVT Working Froup, Internet—Draft, Jul. 2003, XP002320685.
Meier J.D. et al: "Building Secure ASP.NET Applications: Authentication, Authorization, and Secure Communication: Cryptography and Certificates" Microsoft Patterns & Practices, Nov. 2002, pp. 1-5, XP002321827.
Asaka et al., "Dynamic Multicast Routing Using Predetermined Path Search". Technical Report of IEICE (The Institute of Electronics, Information and Communication Engineers), SSE95-56 IN99-37 CS99-78, Sep. 27, 1999.
Tadaumi, "IP Technology as Communication Infra," The Institute of Electronics Information and Communication Engineers, col. 83, No. 4, Apr. 2000, pp. 286-294.
William Stallings: "Cryptography and network security: Principles and Practice" Second Edition, 1999, Prentice Hall, New Jersey.
"Functional Model of a Conditional Access System", EBU Review—Technical European Broadcast Union, Bussell, BE: No. 266; Dec. 21, 1995; pp. 64-77; XP000559450.
"TIA/EIA/IS-95-B Mobile Station-Base Station Compatibility Standard For Dual-Mode Wideband Spread Spectrum Cellular System." (IS-95 STANDARD).
International Search Report PCT/US02/009835, ISA, EPO, Jul. 8, 2002.
3G TS 25.213 V4.1.0 (Jun. 2001) 3rd Generation Partnership Project; Technical Specification Group Radio Access Network; Spreading and Modulation (FDD)(Release 4).
3GPP TS 25.211 V4.2.0 (Sep. 2001) 3rd Generation Partnership Project; Technical Specification Group Radio Access Network; Physical Channels and Mapping of Transport Channels Onto Physical Channels (FDD)(Release 4).
3GPP TS 25.212 V4.2.0 (Sep. 2001) 3rd Generation Partnership Project; Technical 0108 Specification Group Radio Access Network; Multiplexing and Channel Coding (FDD)(Release 4).
3GPP TS 25.214 V4.2.0 (Sept. 2001) 3rd Generation Partnership Project; Technical Specification Group Radio Access Network; Physical Layer Procedures (FDD)(Release 4).
3GPP2 C.S0002-0 Version 1.0 (Jul. 1999) 3rd Generation Partnership Project 2 "3GPP2" Physical Layer Standard for cdma2000 Spread Spectrum Systems.
Al-Tawil, "A new Authentication protocol for Roaming Users in GSM", Proceedings for IEEE International Symposium on Computers and Communication, Jul. 6, 1999, pp. 93-99.
B.G. Marchent et al. "Intelligent Control of Mobile Multimedia Systems" Vehicular Technology Conference 1998. VTC 98, 48th IEEE Ottawa, Canada, May 18-21, 1998; New York, USA, May 18, 1998, pp. 2047-2051.
Baccelli, F et al.: "Self Organizing Hierarchical Multicast Trees And Their Optimization," INFOCOM 1999. IEEE, 1081-1089 (Mar. 21, 1999).
Bormann, et al., "Robust Header Compression (ROHC)," Internet Engineering Task Force IETF Draft, 1-145, Feb. 26, 2001.
Brown: "The Electronic Post It Note Model for Mobile Computing Applications," Computing Lab, The University, Canterbury, Kent, The Institution of Electrical Engineers, IEEE, Savoy Place, London, WC2R OBL, UK.
Estrin, et al., "The Protocol Independent Multicast-Sparse Mode (PIM-SM)," RFC 2362, Jun. 1998.

ETSI:"Universal Mobile Telecommunications Systems (UMTS); Multimedia Broadcast/Multicast Service (MBMS); Stage 1, 3GPP TS 22.146 version 5.2.0 Release 5", ETSI TS 22.146 v5.2.0, pp. 1-15. Mar. 2002.
Gong, L et al: "Trade-Offs In Routing Private Multicast Traffic," Global Telecommunications Conference, 1995, IEEE, 2124-2128 (Nov. 13, 1995).
Greg Rose et al., "The Secure Real Time Transport Protocol," Internet Draft, Feb. 2001, pp. 1-26.
Kalliokulju J.: "User Plane Architecture of 3rd Generation Mobile Telecommunication Network," IEEE International Conference on Networks, ICON, Proceedings on Networks (ICON'99), Sep. 28, 1999-Oct. 1, 1999, pp. 270-278, XP010354980.
Lin, et al: "A Multicast Routing Protocol for Multihop Wireless Networks," Dept. of Computer Science and Information Engineering, Chung Cheng University, Taiwan, Global Telecommunications Conference, XP010373304.
Lou et al., "Progressive Video Streaming Over 2G and 3G Wireless Systems" Proceedings Of The 11TH IEEE International Symposium On Personal Indoor And Mobile Radio Communications, vol. 2, Sep. 18-21, 2000, London, pp. 1550-1554.
Macq. Benoit M et al. "Cryptology for Digital TV Broadcasting"; 1995 IEEE.
Menezes, A et al.: "Handbook of Applied Cryptography"1997, CRC Press LIC, USA XP002248262 pp. 497-500, 551-552.
Menezes, A et al.: "Handbook of Applied Cryptography," Chapter 13, pp. 543-590, CRC Press (1996).
Miyazaki: "A Stream-data Multicast Protocol Using IP Unicast Address" Technical Report of IEICE, IN2001-9, May 11, 2001.
Mooij, W.: "Advances in Conditional Access Technology", IEEE, pp. 461-464 (Sep. 1997).
Moy, "Multicast Extensions to OSPF," RFC 1584, Mar. 1994.
Paul K et al: "A Stability-Based Distributed Routing Mechanism To Support Unicast And Multicast Routing In Ad Hoc Wireless Network" Computer Communications, Elsevier Science Publishers BV, Amsterdam, NL, vol. 24, No. 18, Dec. 1, 2001, pp. 1828-1845, XP0043.
Schneier, B.: "Applied Cryptography, Conference Key Distribution and Secret Broadcasting" Second Edition, pp. 520, 523-524, John Wiley & Sons, Inc. XP002248263 (1996).
Schneier, B.: "Applied Cryptography," Second Edition, pp. 170, 171, 173. John Wiley & Sons, Inc. (1996).
Stallings, W.: "Cryptography and network security" 1995, Prentice-Hall, Inc., XP002248261 pp. 402-406, 413-417, 421-424.
Takahashi: "Prospect of Push type Information Providing Service/ Technology, " Information Processing, vol. 39, No. 11, Nov. 15, 1998, p. 1124-1131.
Tanebaum, Andrew S.: Computer Networks; Second Edition; Pub 1993 XP2530414.
TIA/EIA/IS-856 Interim Standard cdma2000 High Rate Packet Data Air Interface Specification (Nov. 2000).
TIA/EIA/IS-95-A (Revision of TIA/EIA/IS-95) Mobile Station-Base Station Compatibility Standard for Dual-Mode Wideband Spread Spectrum Cellular System (May 1995).
Toh C-K et al: "Abam: On-Demand Associativity-Based Multicast Routing For AD HOC Mobile Networks," Vehicular Technology Conference, 2000. IEEE, 987-993 (2000).
Waitzman, et al., "The Distance Vector Multicast Routing Protocol (DVMRP)," RFC 1075, Nov. 1, 1998.
Yang et al: "An Efficient Multicast Delivery Scheme To Support Mobile IP," Database And Expert Systems Applications, 1999 IEEE, 638-88 (Sep. 1, 1999).
You Xiaohu, "D&R Progress On China's 3G Mobile Communications", Telecom Science, vol. 2, 2001, pp. 11-17.
International Search Report PCT/US02/009826, ISA, EPO, Dec. 9, 2002.
International Search Report PCT/US02/09832, ISA, EPO Nov. 26, 2002.
International Search Report PCT/US02/09833, ISA, EPO, Nov. 26, 2002.
International Search Report PCT/US02/009834, ISA, EPO, Feb. 27, 2003.
International Search Report PCT/US02/009835, ISA, EPO, Jul. 8, 2002.
International Search Report PCT/US03/026897, ISA, EPO, Jan. 16, 2004.
International Search Report PCT/US02/009829, ISA, EPO, Mar. 4, 2003.
International Search Report PCT/US02/009830, ISA, EPO, Mar. 10, 2003.
International Search Report PCT/US02/009831, ISA, EPO, Mar. 4, 2003.
Bormann, C., et al. "Robust header Compression (ROHC)"Internet Draft, Dec. 2000, pp. 1-122, XP002901751 (pp. 4-5).
Carsten Burmeister et al., Robust Header Compression draft-ietf-rohc-rtp-09.txt (http://www.watersprings.org/pub/id/draft-ietf-rohc-rtp-09.txt) 2005, pp. 2.
ETSI TR 125 925 V3.3.0: "Universal Mobile Telecommunications System (UMTS); Radio Interface for Broadcast/Multicast Services (3GPP TR 25.925 version 3.3.0 Release 1999)," XP002230388, pp. 1-35, (Dec. 2000).
Farinacci, D., et al., "Generic Routing Encapsulation (GRE)," Network Working Group Request for Comments: 2784, Mar. 1-8, 2000. URL:http://www.globecom.net/ieft/rfc/rfc2784.html (retrieved on Feb. 14, 2003).
Handley, M. et al., "SDP: Session Description Protocol" Network Working Group, Request for Comments: 2327, Category: Standards Track. ISI/LBNL, Apr. 1998, pp. 1-42.
JNSA, "Trend of the Latest Security Protocol "IPsecH-with Demonstration Experiment Report for Interconnection," Network Magazine, vol. 6, No. 6, Japan, Jun. 2001, vol. 6, pp. 86-93.
Keeler, Robert E., "Interoperability Considerations for Digital HDTV," IEEE Transactions on Broadcasting, vol. 37, No. 4, Dec. 1991, pp. 128-130.
Patent Abstracts of Japan vol. 2003. No. 08 JP2003124927, Sony Corporation, Apr. 25, 2003.
Shannon, C.E., "A Mathematical Theory of Communication," The Bell System Technical Journal, vol. 27, pp. 379-423, 623-656, Jul., Oct. 1948.
Simpson, W., "PPP in HDLC-Like Framing," Network Working Group, Request for Comments: 1662 (RFC 1662), Jul. 1994, pp. 1-34.
Tanenbaum, Andrew S.: Computer Networks, Third Edition; Pub. 1996; pp. 8, and 179-190.
TIA/EIA/IS-95-B Mobile Station-Base Station Compatibility Standard for Dual-Mode Wideband Spread Spectrum Cellular System (IS-95 Standard), Feb. 3, 1999.
Alfred J. Menezes, Paul C. van Oorschot and Scott A. Vanstone. Handbook of Applied Cryptography, CRC Press. (Oct. 1996): p. 364 (in particular, refer to section 9.6.3), http://www.cacr.math.uwaterloo.ca/hac/about/chap9.pdf.
European Search Report—EP10004607, Search Authority—Munich Patent Office, Nov. 18, 2010.
Haverinen, et al., "EAP SIM Authentication" draft-haver inen-pppext-eap-sim-11 .txt, [online] <URL:http://www.watersprings.orglpub/id/draft-haverinen-pppext-eap-sim- 11 .txt> Jun. 2003, pp. 1-64.
Haverinen H: "EAP SIM Authentication", 3GPP DRAFT; S3-010663 Draft-haverinen-PPPEXT-EAP-SIM-0 2, 3RD Generation Partnership-Project (3GPP), Mobile Competence Centre ; 650, Route Des Lucioles ; F-06921 Sophia-Antipolis Cedex ; France, vol. SA WG3, No. Sophia; Nov. 28, 2001, XP050271835, [retrieved on Nov. 28, 2001].
Okamoto, "Encryption Technology For Realizing A Bright Information Society 5: Management of Encryption Key Distribution", Bit, Japan, Kyoritsu Shuppan Co., Ltd., Nov. 1, 1991, vol. 23, No. 12, pp. 51-59.
Supplementary European Search Report—EP04777745, Search Authority—Berlin Patent Office, Dec. 14, 2010.
Taiwanese Search report—093124861—TIPO—Dec. 7, 2010.
Brown, D., "Techniques for Privacy and Authentication in Personal Communication Systems," IEEE Personal Communications, vol. 2, No. 4, pp. 6-10, Aug. 1995, doi: 10.1109/98.403452.

Translation of Office Action in Japan Application 2004-531597 corresponding to U.S. Appl. No. 11/626,822, citing JP2002506296, JP2002026835, JP2002152194, JP2000287192, JP20017800, WO0062476, JP7115414, JP7288798, JP10214233, JP11510668, JP2000134193, JP2001134193, JP2001512842, JP2001513587, JP2002027417, JP2002521879, JP2002505458, JP2002232418, WO02061572 and JP2003529963 dated Nov. 24, 2011.

Translation of Office Action in Japan application 2006-518894 corresponding to U.S. Appl. No. 10/870,303, citing JP2002541685, WO0208449, WO2005008393, Dan_Brown_Techniques_pgs_6_10_year_1995 and Haverinen_EAP_SIM_year_2003 dated Mar. 22 2011.

Translation of Office Action in Japanese Application 2002-577339 corresponding to U.S. Appl. No. 09/933,971 , citing JP11331070, JP2090840, JP2000244603 and JP2000115860 dated Oct. 19, 2010.

Translation of Office Action in Japanese Application 2008-184930 corresponding to U.S. Appl. No. 12/703,099, citing JP2001177564, JP10200536, T. Asaka et. al., T. Miyazaki et. al., WO0156232 and WO0150783 dated Feb. 8, 2011.

"Feature Story I: Evolution of Cellular Phones," ASCII, Dec. 1, 2000, vol. 24, No. 12, p. 204.

China's third generation mobile communications research and development progress, Feb. 15, 2001.

* cited by examiner

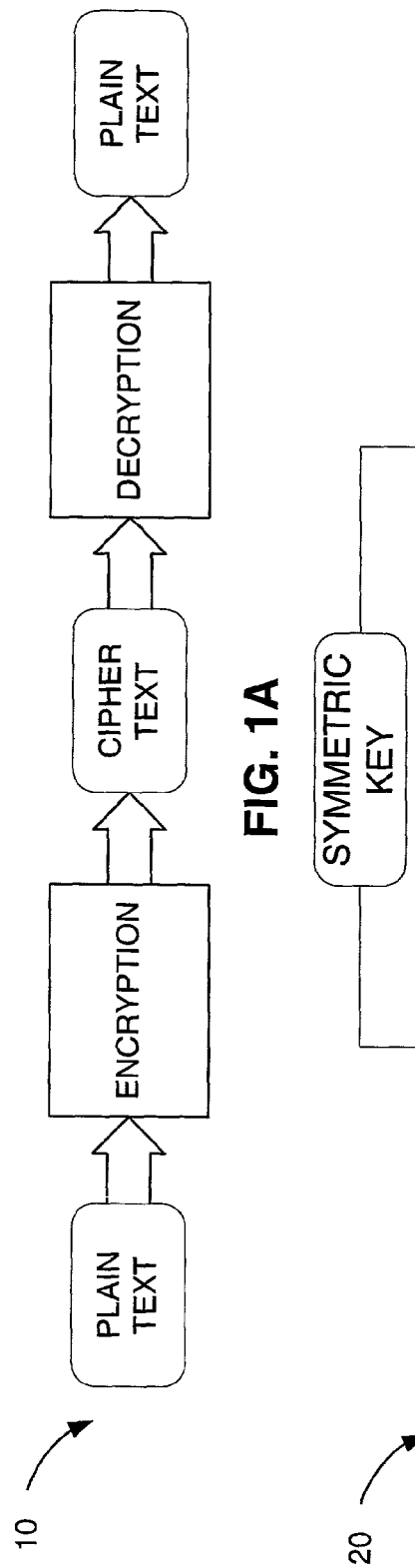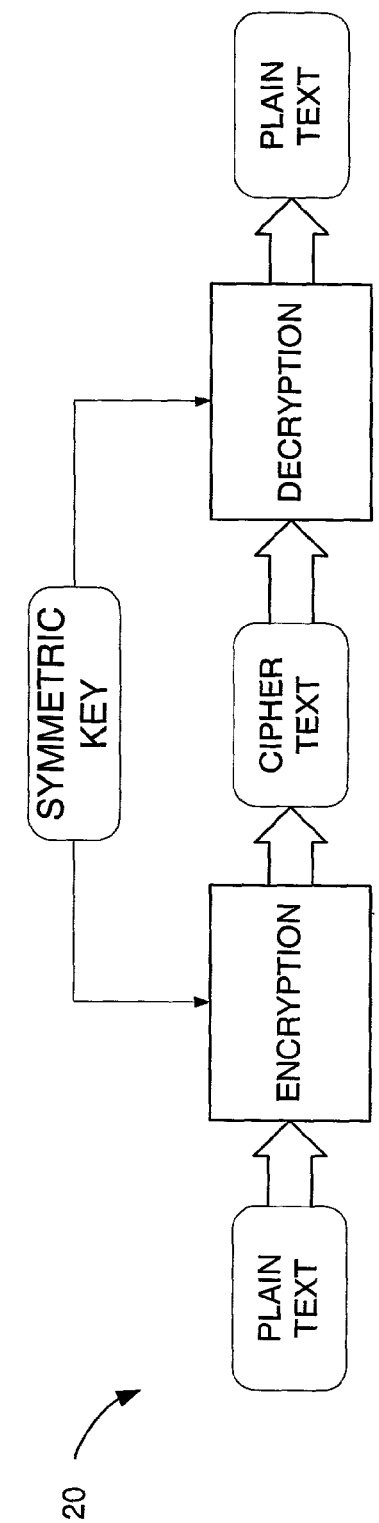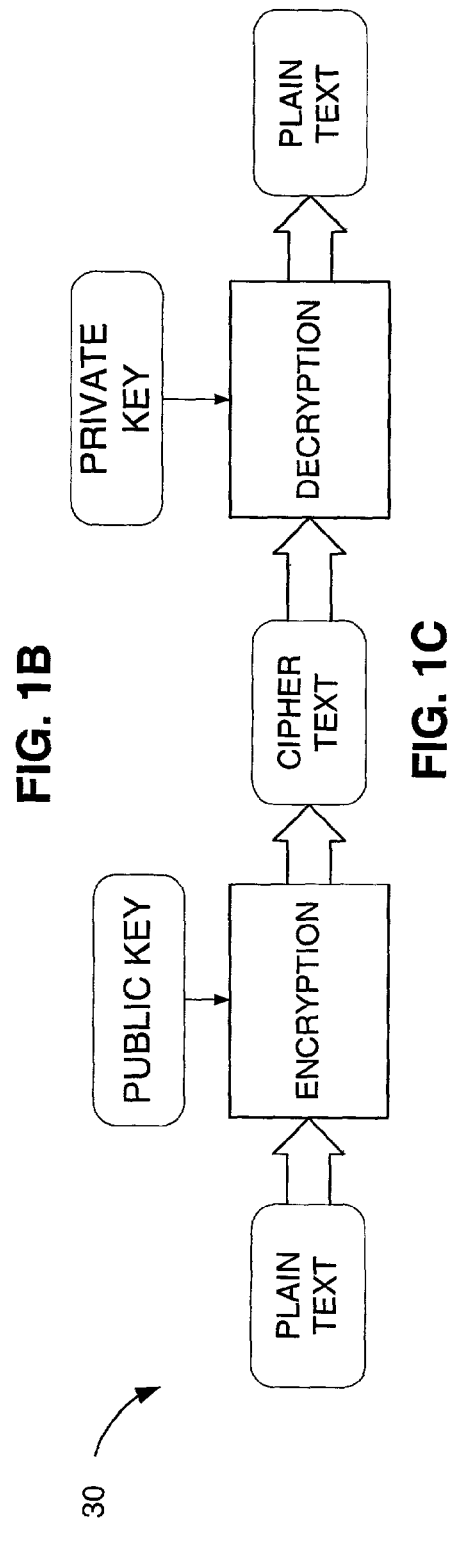

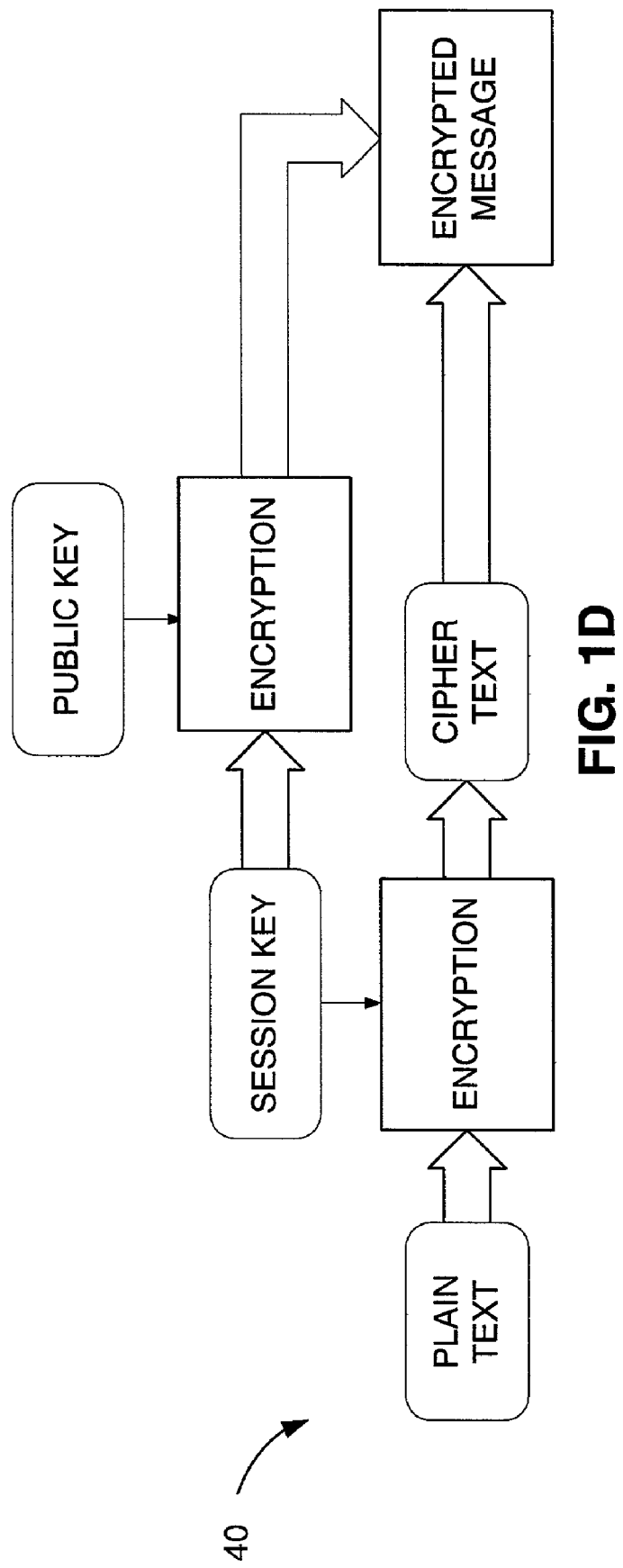

METHOD AND APPARATUS FOR SECURITY IN A DATA PROCESSING SYSTEM

CLAIM OF PRIORITY UNDER 35 U.S.C. §120

The present Application for Patent claims priority of U.S. Provisional Application No. 60/279,970, filed Mar. 28, 2001, assigned to the assignee hereof and hereby expressly incorporated by reference herein.

REFERENCE TO CO-PENDING APPLICATIONS FOR PATENT

The present invention is related to the following Applications for Patent in the U.S. Patent & Trademark Office:

"METHOD AND APPARATUS FOR OVERHEAD MESSAGING IN A WIRELESS COMMUNICATION SYSTEM" by Nikolai Leung, having U.S. application Ser. No. 09/933,971, filed Aug. 20, 2001 and assigned to the assignee hereof, and which is expressly incorporated by reference herein;

"METHOD AND APPARATUS FOR OUT-OF-BAND TRANSMISSION OF BROADCAST SERVICE OPTION IN A WIRELESS COMMUNICATION SYSTEM" by Nikolai Leung, having U.S. application Ser. No. 09/934,021, filed Aug. 20, 2001 and assigned to the assignee hereof, and which is expressly incorporated reference herein;

"METHOD AND APPARATUS FOR BROADCAST SIGNALING IN A WIRELESS COMMUNICATION SYSTEM" by Nikolai Leung, having U.S. application Ser. No. 09/933,914, filed Aug. 20, 2001 and assigned to the assignee hereof, and which is expressly incorporated by reference herein;

"METHOD AND APPARATUS FOR TRANSMISSION FRAMING IN A WIRELESS COMMUNICATION SYSTEM" by Raymond Hsu, having U.S. application Ser. No. 09/933,639, filed Aug. 20, 2001 and assigned to the assignee hereof, and which is expressly incorporated by reference herein;

"METHOD AND APPARATUS FOR DATA TRANSPORT IN A WIRELESS COMMUNICATION SYSTEM" by Raymond Hsu, having U.S. application Ser. No. 09/933,977, filed Aug. 20, 2001 and assigned to the assignee hereof, and which is expressly incorporated by reference herein; and "METHOD AND APPARATUS FOR HEADER COMPRESSION IN A WIRELESS COMMUNICATION SYSTEM" by Raymond Hsu, having U.S. application Ser. No. 09/933,690, filed Aug. 20, 2001 and assigned to the assignee hereof, and which is expressly incorporated by reference herein.

BACKGROUND

1. Field

The present invention relates to data processing systems generally and specifically, to methods and apparatus for security in a data processing system.

2. Background

Security in data processing and information systems, including communications systems, contributes to accountability, fairness, accuracy, confidentiality, operability, as well as a plethora of other desired criteria. Encryption, or the general field of cryptography, is used in electronic commerce, wireless communications, broadcasting, and has an unlimited range of applications. In electronic commerce, encryption is used to prevent fraud in and verify financial transactions. In data processing systems, encryption is used to verify a participant's identity. Encryption is also used to prevent hacking, protect Web pages, and prevent access to confidential documents.

Asymmetric encryption system, often referred to as a cryptosystem, uses a same key (i.e., the secret key) to encrypt and decrypt a message. Whereas an asymmetric encryption system uses a first key (i.e., the public key) to encrypt a message and uses a different key (i.e., the private key) to decrypt it. Asymmetric cryptosystems are also called public key cryptosystems. A problem exists in symmetric cryptosystems in the secure provision of the secret key from a sender to a recipient. Further, a problem exists when keys or other encryption mechanisms are updated frequently. In a data processing system methods of securely updating keys incur processing time, memory storage and other processing overhead. In a wireless communication system, updating keys uses valuable bandwidth used for transmission.

The prior art does not provide a method for updating keys to a large group of mobile stations in order that they may access an encrypted broadcast. There is a need, therefore, for a secure and efficient method of updating keys in a data processing system. Further, there is a need for a secure and efficient method of updating keys in a wireless communication system.

SUMMARY

Embodiments disclosed herein address the above stated needs by providing a method for security in a data processing system.

In one aspect a method for secure transmissions includes determining a registration key specific to a participant in a transmission, determining a first key, encrypting the first key with the registration key, determining a second key, encrypting the second key with the first key and updating the first and second keys.

In another aspect, a method for secure reception of a transmission includes receiving a registration key specific to a participant in a transmission, receiving a first key, decrypting the first key with the registration key, receiving a second key, decrypting the second key with the first key, receiving a broadcast stream of information, and decrypting the broadcast stream of information using the second key.

In still another aspect a wireless communication system supporting a broadcast service option has an infrastructure element including a receive circuitry, a user identification unit, operative to recover a short-time key for decrypting a broadcast message, and a mobile equipment unit adapted to apply the short-time key for decrypting the broadcast message. The user identification unit includes a processing unit operative to decrypt key information, and a memory storage unit for storing a registration key.

BRIEF DESCRIPTION OF THE DRAWINGS

FIG. 1A is a diagram of a cryptosystem.
FIG. 1B is a diagram of a symmetric cryptosystem.
FIG. 1C is a diagram of an asymmetric cryptosystem.
FIG. 1D is a diagram of a PGP encryption system.

DETAILED DESCRIPTION

Figure 1E:
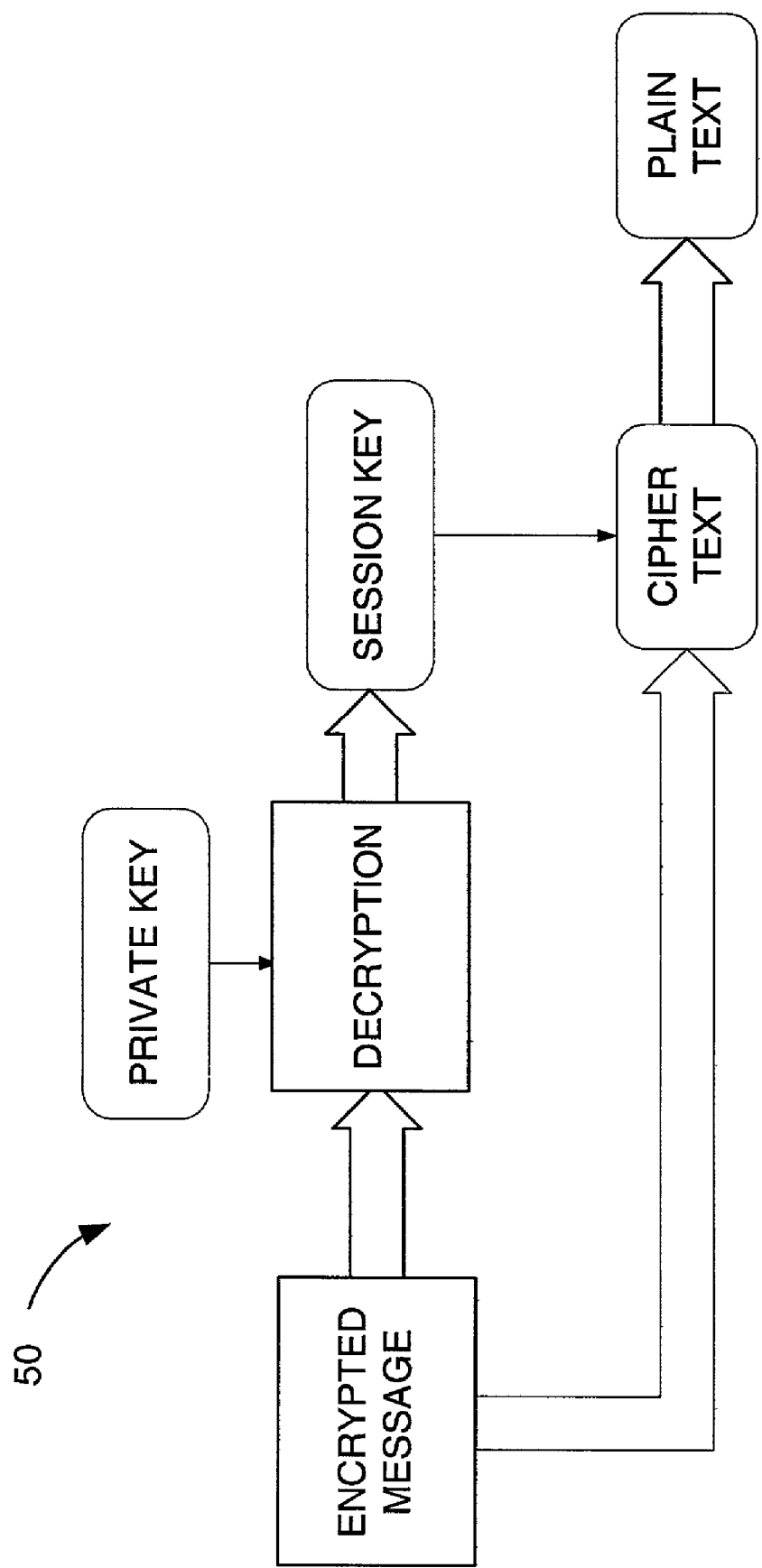
FIG. 1E is a diagram of a PGP decryption system.

The word "exemplary" is used exclusively herein to mean "serving as an example, instance, or illustration." Any embodiment described herein as "exemplary" is not necessarily to be construed as preferred or advantageous over other embodiments.

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the WCDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with cdma2000 systems. Alternate embodiments may incorporate another standard/system. Still other embodiments may apply the security methods disclosed herein to any type of data processing system using a cryptosystem.

A cryptosystem is a method of disguising messages thus allowing a specific group of users to extract the message. FIG. 1A illustrates a basic cryptosystem 10. Cryptography is the art of creating and using cryptosystems. Cryptanalysis is the art of breaking cryptosystems, i.e., receiving and understanding the message when you are not within the specific group of users allowed access to the message. The original message is referred to as a plaintext message or plaintext. The encrypted message is called a ciphertext, wherein encryption includes any means to convert plaintext into ciphertext. Decryption includes any means to convert ciphertext into plaintext, i.e., recover the original message. As illustrated in FIG. 1A, the plaintext message is encrypted to form a ciphertext. The ciphertext is then received and decrypted to recover the plaintext. While the terms plaintext and ciphertext generally refer to data, the concepts of encryption may be applied to any digital information, including audio and video data presented in digital form. While the description of the invention provided herein uses the term plaintext and ciphertext consistent with the art of cryptography, these terms do not exclude other forms of digital communications.

A cryptosystem is based on secrets. A group of entities shares a secret if an entity outside this group cannot obtain the secret without significantly large amount of resources. This secret is said to serve as a security association between the groups of entities.

A cryptosystem may be a collection of algorithms, wherein each algorithm is labeled and the labels are called keys. A symmetric encryption system, often referred to as a cryptosystem, uses a same key (i.e., the secret key) to encrypt and decrypt a message. A symmetric encryption system 20 is illustrated in FIG. 1B, wherein both the encryption and decryption utilize a same private key.

In contrast, an asymmetric encryption system uses a first key (i.e., the public key) to encrypt a message and uses a different key (i.e., the private key) to decrypt it. FIG. 1C illustrates an asymmetric encryption system 30 wherein one key is provided for encryption and a second key for decryption. Asymmetric cryptosystems are also called public key cryptosystems. The public key is published and available for encrypting any message, however, only the private key may be used to decrypt the message encrypted with the public key.

A problem exists in symmetric cryptosystems in the secure provision of the secret key from a sender to a recipient. In one solution a courier may be used to provide the information, or, a more efficient and reliable solution may be to use a public key cryptosystem, such as a public-key cryptosystem defined by Rivest, Shamir, and Adleman (RSA) which is discussed hereinbelow. The RSA system is used in the popular security tool referred to as Pretty Good Privacy (PGP), which is further detailed hereinbelow. For instance, an originally recorded cryptosystem altered letters in a plaintext by shifting each letter by n in the alphabet, wherein n is a predetermined constant integer value. In such a scheme, an "A" is replaced with a "D," etc., wherein a given encryption scheme may incorporate several different values of n. In this encryption scheme "n" is the key. Intended recipients are provided the encryption scheme prior to receipt of a ciphertext. In this way, only those knowing the key should be able to decrypt the ciphertext to recover the plaintext. However, by calculating the key with knowledge of encryption, unintended parties may be able to intercept and decrypt the ciphertext, creating a security problem.

More complicated and sophisticated cryptosystems employ strategic keys that are deter interception and decryption from unintended parties. A classic cryptosystem employs encryption functions E and decryption functions D such that:

$$D\_K(E\_K(P))=P, \text{ for any plaintext } P. \quad (1)$$

In a public-key cryptosystem, E_K is easily computed from a known "public key" Y which in turn is computed from K. Y is published, so that anyone can encrypt messages. The decryption function D_K is computed from public key Y, but only with knowledge of a private key K. Without the private key K an unintended recipient may not decrypt the ciphertext so generated. In this way only the recipient who generated K can decrypt messages.

RSA is a public-key cryptosystem defined by Rivest, Shamir, and Adleman. As an example, consider plaintexts as positive integers up to $2^{512}$. Keys are quadruples (p,q,e,d), with p given as a 256-bit prime number, q as a 258-bit prime number, and d and e large numbers with (de−1) divisible by (p−1)(q−1). Further, define the encryption function as:

$$E\_K(P) = P^e \bmod pq, \quad D\_K(C) = C^d \bmod pq. \quad (2)$$

While, E_K is easily computed from the pair (pq,e), there is no known simple way to compute D_K from the pair (pq,e). Therefore, the recipient that generates K can publish (pq,e). It is possible to send a secret message to the recipient, as he is the one able to read the message.

PGP combines features from symmetric and asymmetric encryption. FIGS. 1D and 1E illustrate a PGP cryptosystem 50, wherein a plaintext message is encrypted and recovered. In FIG. 1D, the plaintext message is compressed to save modem transmission time and disk space. Compression strengthens cryptographic security by adding another level of translation to the encrypting and decrypting processing. Most cryptanalysis techniques exploit patterns found in the plaintext to crack the cipher. Compression reduces these patterns in the plaintext, thereby enhancing resistance to cryptanalysis. Note that one embodiment does not compress plaintext or other messages that are too short to compress or which don't compress well aren't compressed.

PGP then creates a session key, which is a one-time-only secret key. This key is a random number that may be generated from any random event(s), such as random movements of mouse and the keystrokes while typing. The session key works with a secure encryption algorithm to encrypt the plaintext, resulting in ciphertext. Once the data is encrypted, the session key is then encrypted to the recipient's public key. This public key-encrypted session key is transmitted along with the ciphertext to the recipient.

For decryption, as illustrated in FIG. 1E, the recipient's copy of PGP uses a private key to recover the temporary session key, which PGP then uses to decrypt the conventionally encrypted ciphertext. The combination of encryption methods takes advantage of the convenience of public key encryption and the speed of symmetric encryption. Symmetric encryption is generally much faster than public key encryption. Public key encryption in turn provides a solution to key distribution and data transmission issues. In combination, performance and key distribution are improved without any sacrifice in security.

A key is a value that works with a cryptographic algorithm to produce a specific ciphertext. Keys are basically very large numbers. Key size is measured in bits. In public key cryptography, security increases with key size, however, public key size and the symmetric encryption private key size are not generally related. While the public and private keys are mathematically related, a difficulty arises in deriving a private key given only a public key. Deriving the private key is possible given enough time and computing power, making the selection of key size an important security issue. The goal is to have a large key that is secure, while maintaining key size sufficiently small for quick processing. An additional consideration is the expected interceptor, specifically, what is the importance of a message to a third party, and how much resource does a third party have to decrypt.

Larger keys will be cryptographically secure for a longer period of time. Keys are stored in encrypted form. PGP specifically stores keys in two files; one for public keys and one for private keys. These files are called keyrings. In application, a PGP encryption system adds the public keys of target recipients to the sender's public keyring. The sender's private keys are stored on the sender's private keyring.

As discussed in the examples given hereinabove, the method of distributing the keys used for encryption and decryption can be complicated. The "key exchange problem" involves first ensuring that keys are exchanged such that both the sender and receiver can perform encryption and decryption, respectively, and for bi-directional communication, such that the sender and receiver can both encrypt and decrypt messages. Further, it is desired that key exchange be performed so as to preclude interception by a third unintended party. Finally, an additional consideration is authentication providing assurance to the receiver that a message was encrypted by an intended sender and not a third party. In a private key exchange system, the keys are exchanged secretly providing improved security upon successful key exchange and valid authentication. Note that the private key encryption scheme implicitly provides authentication. The underlying assumption in a private key cryptosystem is that only the intended sender will have the key capable of encrypting messages delivered to the intended receiver. While public-key cryptographic methods solve a critical aspect of the 'key-exchange problem', specifically their resistance to analysis even with the presence a passive eavesdropper during exchange of keys, they do not solve all problems associated with key exchange. In particular, since the keys are considered 'public knowledge,' (particularly with RSA) some other mechanism is desired to provide authentication, as possession of keys alone (sufficient to encrypt messages) is no evidence of a particular unique identity of the sender, nor is possession of a corresponding decryption key by itself enough to establish the identity of the recipient.

One solution is to develop a key distribution mechanism that assures that listed keys are actually those of the given entities, sometimes called a trusted authority, certificate authority, or third part escrow agent. The authority typically does not actually generate keys, but does ensure that the lists of keys and associated identities kept and advertised for reference by senders and receivers are correct and uncompromised. Another method relies on users to distribute and track each other's keys and trust in an informal, distributed fashion. Under RSA, if a user wishes to send evidence of their identity in addition to an encrypted message, a signature is encrypted with the private key. The receiver can use the RSA algorithm in reverse to verify that the information decrypts, such that only the sender could have encrypted the plaintext by use of the secret key. Typically the encrypted 'signature' is a 'message digest' that comprises a unique mathematical 'summary' of the secret message (if the signature were static across multiple messages, once known previous receivers could use it falsely). In this way, theoretically only the sender of the message could generate a valid signature for that message, thereby authenticating it for the receiver.

A message digest is often computed using a cryptographic hash function. A cryptographic hash function computes a value (with a fixed number of bits) from any input, regardless of the length of the input. One property of a cryptographic hash function is this: given an output value, it is computationally difficult to determine an input that will result in that output. An example of a cryptographic hash function is SHA-1 as described in "Secure Hash Standard," FIPS PUB 180-1, promulgated by the Federal Information Processing Standards Publications (FIPS PUBS) and issued by the National Institute of Standards and Technology.

Figure 2:
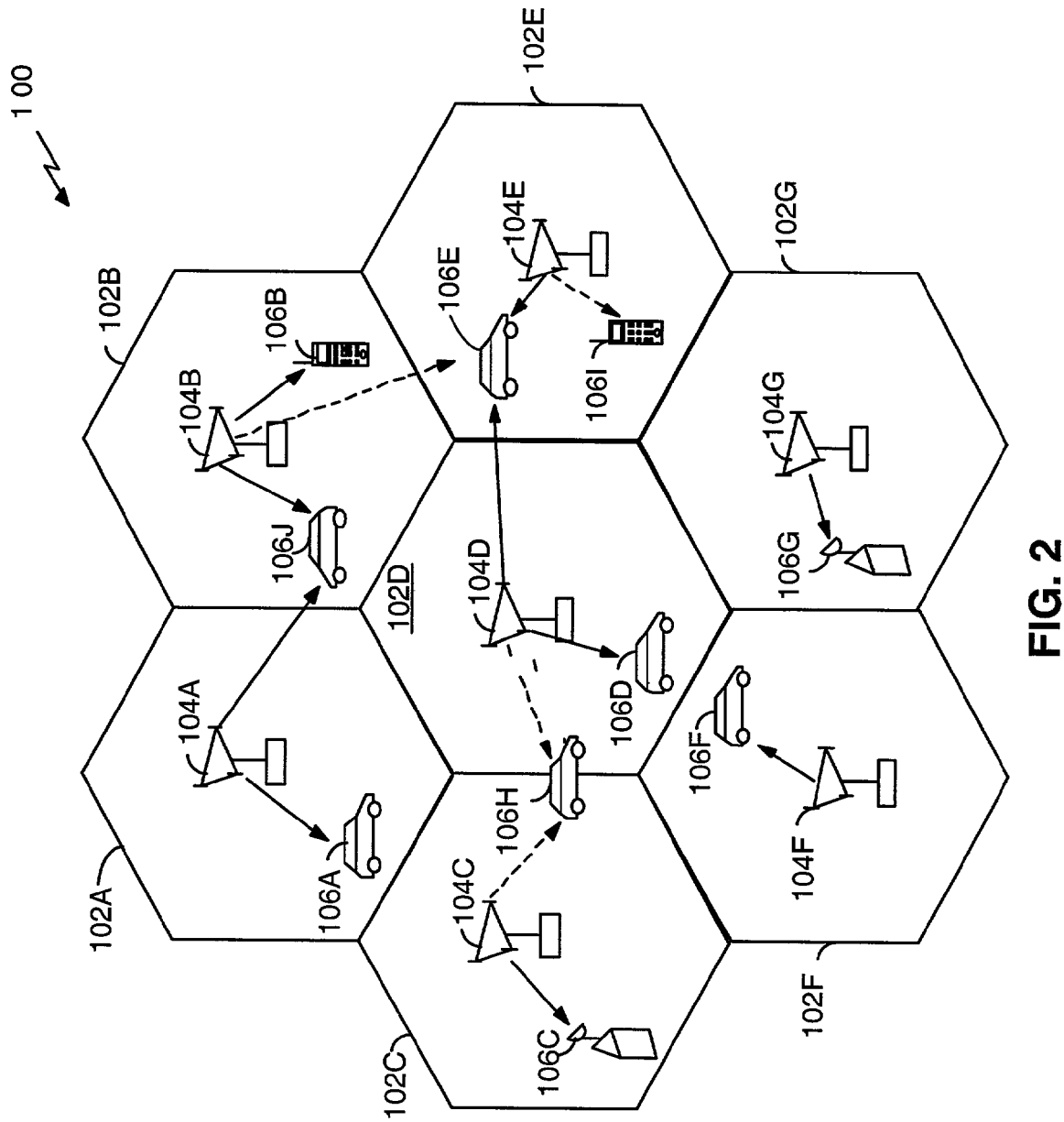
FIG. 2 is a diagram of a spread spectrum communication system that supports a number of users.

FIG. 2 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 2, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "METHOD AND SYSTEM FOR PROVIDING A SOFT HANDOFF IN A CDMA CELLULAR TELEPHONE SYSTEM," which is assigned to the assignee of the present invention.

The downlink, or FL, refers to transmission from the base station to the terminal, and the uplink, or RL, refers to transmission from the terminal to the base station. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 2 is consistent with a CDMA type system having HDR service.

According to one embodiment, the system 100 supports a high-speed multimedia broadcasting service referred to as High-Speed Broadcast Service (HSBS). An example application for HSBS is video streaming of movies, sports events, etc. The HSBS service is a packet data service based on the Internet Protocol (IP). According to the exemplary embodiment, a service provider indicates the availability of such high-speed broadcast service to the users. The users desiring the HSBS service subscribe to receive the service and may discover the broadcast service schedule through advertisements, Short Management System (SMS), Wireless Application Protocol (WAP), etc. Mobile users are referred to as Mobile Stations (MSs). Base Stations (BSs) transmit HSBS related parameters in overhead messages. When an MS desires to receive the broadcast session, the MS reads the overhead messages and learns the appropriate configurations. The MS then tunes to the frequency containing the HSBS channel, and receives the broadcast service content.

The service being considered is a high-speed multimedia broadcasting service. This service is referred to as High-Speed Broadcast Service (HSBS) in this document. One such example is video streaming of movies, sports events, etc. This service will likely be a packet data service based on the Internet Protocol (IP).

The service provider will indicate the availability of such high-speed broadcast service to the users. The mobile station users who desire such service will subscribe to receive this service and may discover the broadcast service schedule through advertisements, SMS, WAP, etc. Base stations will transmit broadcast service related parameters in overhead messages. The mobiles that wish to listen to the broadcast session will read these messages to determine the appropriate configurations, tune to the frequency containing the high-speed broadcast channel, and start receiving the broadcast service content.

There are several possible subscription/revenue models for HSBS service, including free access, controlled access, and partially controlled access. For free access, no subscription is needed by the user to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

For controlled access, the MS users subscribe to the service and pay the corresponding fee to receive the broadcast service. Unsubscribed users are not able to receive the HSBS service. Controlled access can be achieved by encrypting the HSBS transmission/content so that only the subscribed users can decrypt the content. This may use over-the-air encryption key exchange procedures. This scheme provides strong security and prevents theft-of-service.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Schedule of these unencrypted segments could be known to the MS through external means.

Figure 3:
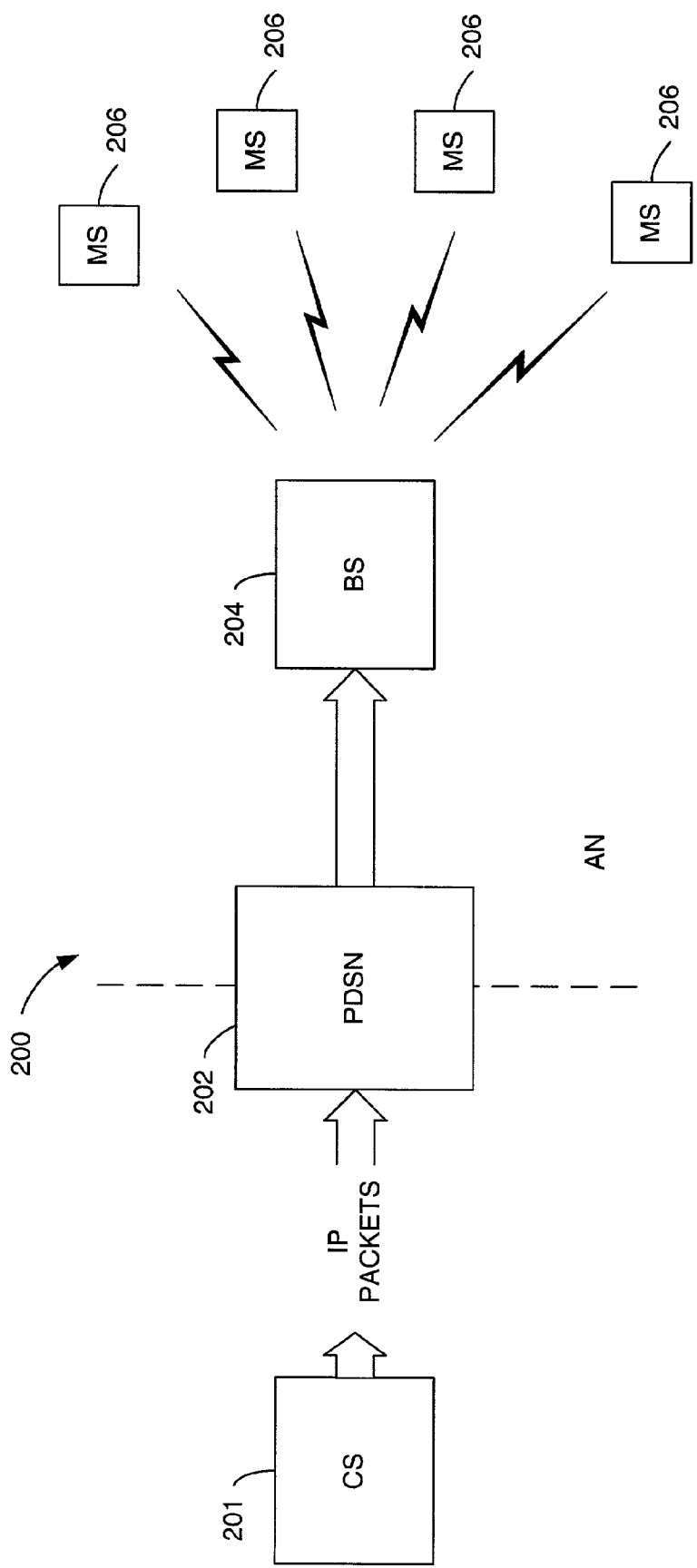
FIG. 3 is a block diagram of the communication system supporting broadcast transmissions.

A wireless communication system 200 is illustrated in FIG. 3, wherein video and audio information is provided to Packetized Data Service Network (PDSN) 202 by a Content Server (CS) 201. The video and audio information may be from televised programming or a radio transmission. The information is provided as packetized data, such as in IP packets. The PDSN 202 processes the IP packets for distribution within an Access Network (AN). As illustrated the AN is defined as the portions of the system including a BS 204 in communication with multiple MS 206. The PDSN 202 is coupled to the BS 204. For HSBS service, the BS 204 receives the stream of information from the PDSN 202 and provides the information on a designated channel to subscribers within the system 200. To control the access, the content is encrypted by the CS 201 before being provided to the PDSN 202. The subscribed users are provided with the decryption key so that the IP packets can be decrypted.

Figure 4:
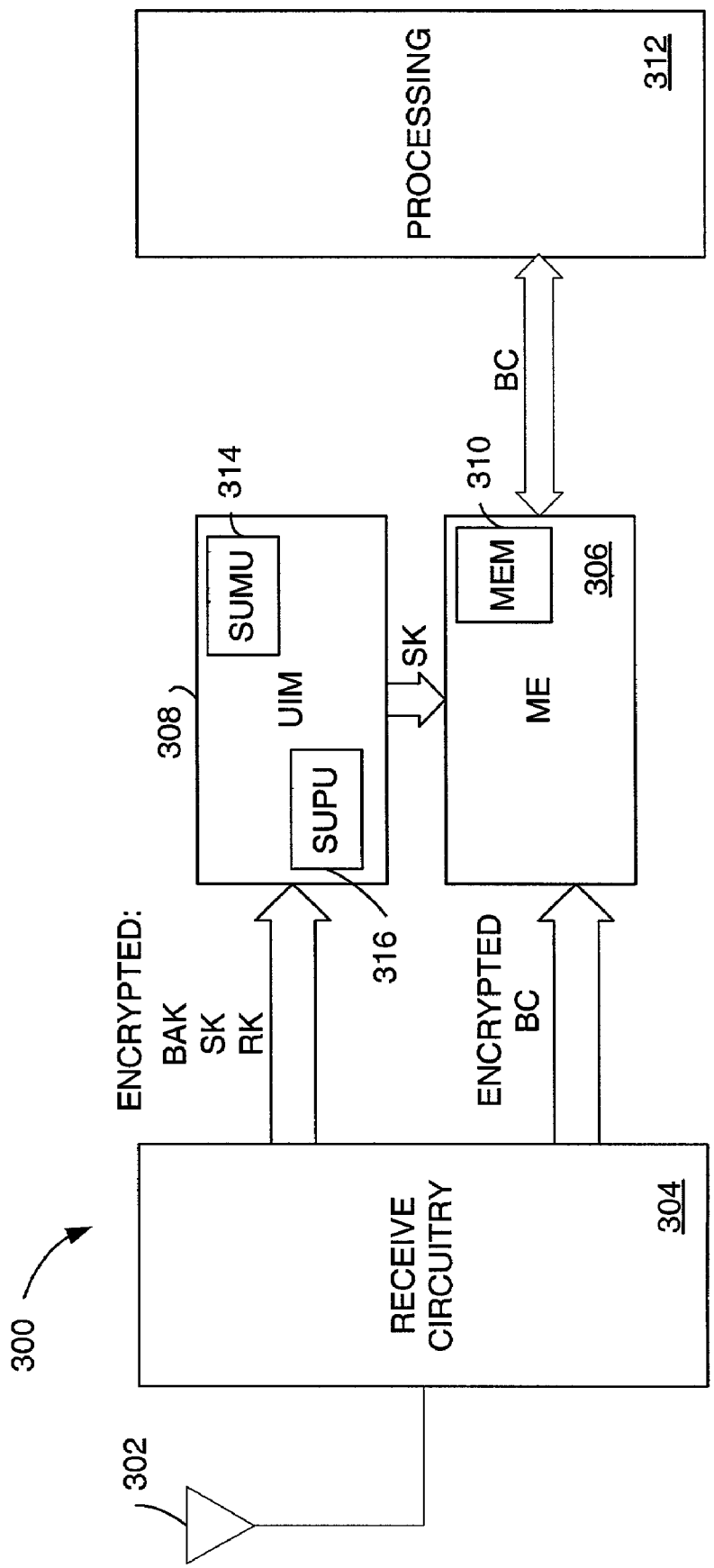
FIG. 4 is a block diagram of a mobile station in a wireless communication system.

FIG. 4 details an MS 300, similar to MS 206 of FIG. 3. The MS 300 has an antenna 302 coupled to receive circuitry 304. The MS 300 receives transmissions from a BS (not shown) similar to BS 204 of FIG. 3. The MS 300 includes a User Identification Module (UIM) 308 and a Mobile Equipment (ME) 306. The receive circuitry is coupled to the UIM 308 and the ME 306. The UIM 308 applies verification procedures for security of the HSBS transmission and provides various keys to the ME 306. The ME 306 may be coupled to processing unit 312. The ME 306 performs substantial processing, including, but not limited to, decryption of HSBS content streams. The ME 306 includes a memory storage unit, MEM 310. In the exemplary embodiment the data in the ME 306 processing (not shown) and the data in the ME memory storage unit, MEM 310 may be accessed easily by a non-subscriber by the use of limited resources, and therefore, the ME 306 is said to be insecure. Any information passed to the ME 306 or processed by the ME 306 remains securely secret for only a short amount of time. It is therefore desired that any secret information, such as key(s), shared with the ME 306 be changed often.

The UIM 308 is trusted to store and process secret information (such as encryption keys) that should remain secret for a long time. As the UIM 308 is a secure unit, the secrets stored therein do not necessarily require the system to change the secret information often. The UIM 308 includes a processing unit referred to as a Secure UIM Processing Unit (SUPU) 316 and memory storage unit referred to as a Secure UIM Memory Unit (SUMU) 314 that is trusted to be secure. Within the UIM 308, SUMU 314 stores secret information in such a way that as to discourage unauthorized access to the information. If the secret information is obtained from the UIM 308, the access will require a significantly large amount of resources. Also within the UIM 308, the SUPU 316 performs computations on values that may be external to the UIM 308 and/or internal to the UIM 308. The results of the computation may be stored in the SUMU 314 or passed to the ME 306. The computations performed with the SUPU 316 can only be obtained from the UIM 308 by an entity with significantly large amount of resources. Similarly, outputs from the SUPU 316 that are designated to be stored within the SUMU 314 (but not output to the ME 306) are designed such that unauthorized interception requires significantly large amount of resources. In one embodiment, the UIM 308 is a stationary unit within the MS 300. Note that in addition to the secure memory and processing within the UIM 308, the UIM 308 may also include non-secure memory and processing (not shown) for storing information including telephone numbers, e-mail address information, web page or URL address information, and/or scheduling functions, etc.

Alternate embodiments may provide a removable and/or reprogrammable UIM. In the exemplary embodiment, the SUPU 316 does not have significant processing power for functions beyond security and key procedures, such as to allow encryption of the broadcast content of the HSBS. Alternate embodiments may implement a UIM having stronger processing power.

The UIM is associated with a particular user and is used primarily to verify that the MS 300 is entitled to the privileges afforded the user, such as access to the mobile phone network. Therefore, a user is associated with the UIM 308 rather than an MS 300. The same user may be associated with multiple UIM 308.

The broadcast service faces a problem in determining how to distribute keys to subscribed users. To decrypt the broadcast content at a particular time, the ME must know the current decryption key. To avoid theft-of-service, the decryption key should be changed frequently, for example, every minute. These decryption keys are called Short-term Keys (SK). The SK is used to decrypt the broadcast content for a short-amount of time so the SK can be assumed to have some amount of intrinsic monetary value for a user. For example, this intrinsic monetary value may be a portion of the registration costs. Assume that the cost of a non-subscriber obtaining SK from the memory storage unit, MEM 310, of a subscriber exceeds the intrinsic monetary value of SK. That is, the cost of obtaining SK (illegitimately) exceeds the reward, so there is no benefit. Consequently, there is no need to protect SK in the memory storage unit, MEM 310. However, if a secret key has a lifetime longer than that of an SK, then the cost of obtaining this secret key (illegitimately) is less than the reward. In this situation, there is a benefit in obtaining such a key from the memory storage unit, MEM 310. Hence, ideally the memory storage unit, MEM 310 will not store secrets with a lifetime longer than that of an SK.

The channels used by the CS (not shown) to distribute the SK to the various subscriber units are considered insecure. Therefore, when distributing a given SK, the CS desires to use a technique that hides the value of the SK from non-subscribed users. Furthermore, the CS distributes the SK to each of a potentially large number of subscribers for processing in respective MEs within a relatively short timeframe. Known secure methods of key transmission are slow and require transmission of a large number of keys, and are generally not feasible for the desired criteria. The exemplary embodiment is a feasible method of distributing decryption keys to a large set of subscribers within a small time-frame in such a way that non-subscribers cannot obtain the decryption keys.

In the exemplary embodiment, the MS 300 supports HSBS in a wireless communication system. To obtain access to HSBS, the user must register and then subscribe to the service. Once the subscription is enabled, the various keys are updated periodically. In the registration process the CS and UIM 308 agree on a Registration Key (RK) that serves as a security association between the user and the CS. The CS may then send the UIM further secret information encrypted with the RK. The RK is kept as a secret in the UIM 308, and is unique to a given UIM, i.e., each user is assigned a different RK. The registration process alone does not give the user access to HSBS. As stated hereinabove, after registration the user subscribes to the service. In the subscription process the CS sends the UIM 308 the value of a common Broadcast Access Key (BAK). The CS sends the MS 300, and specifically UIM 308, the value of BAK encrypted using the RK unique to UIM 308. The UIM 308 is able to recover the value of the original BAK from the encrypted version using the RK. The BAK serves as a security association between the CS and the group of subscribed users. The CS then broadcasts data called SK Information (SKI) that is combined with the BAK in the UIM 308 to derive SK. The UIM 308 then passes SK to the ME 306. In this way, the CS can efficiently distribute new values of SK to the ME of subscribed users.

The following paragraphs discuss the registration process in more detail. When a user registers with a given CS, the UIM 308 and the CS (not shown) set-up a security association. That is, the UIM 308 and the CS agree on a secret key RK. The RK is unique to each UIM 308, although if a user has multiple UIMs then these UIMs may share the same RK dependent on the policies of the CS. This registration may occur when the user subscribes to a broadcast channel offered by the CS or may occur prior to subscription. A single CS may offer multiple broadcast channels. The CS may choose to associate the user with the same RK for all channels or require the user to register for each channel and associate the same user with different RKs on different channels. Multiple CSs may choose to use the same registration keys or require the user to register and obtain a different RK for each CS.

Two common scenarios for setting up this security association include the Authenticated Key Agreement (AKA) method (as used in 3GPP) and the Internet Key Exchange (IKE) method as used in IPsec. In either case the UIM memory unit SUMU 314 contains a secret key referred to as the A-key. As an example, the AKA method is described. In the AKA method the A-key is a secret known only to the UIM and a trusted third party (TTP): the TTP may consist of more than one entity. The TTP is typically the mobile service provider with whom the user is registered. All communication between the CS and TTP is secure, and the CS trusts that the TTP will not assist unauthorized access to the broadcast service. When the user registers, the CS informs the TTP that the user wishes to register for the service and provides verification of the user's request. The TTP uses a function (similar to a cryptographic hash function) to compute the RK from the A-key and additional data called Registration Key Information (RKI). The TTP passes RK, RKI to the CS over a secure channel along with other data not relevant to this submission. The CS sends RKI to the MS 300. The receiver circuitry 304 passes RKI to the UIM 308 and possibly passes RKI to the ME 306. The UIM 308 computes RK from RKI and the A-key that is stored in the UIM memory unit SUMU 314. The RK is stored in the UIM memory unit SUMU 314 and is not provided directly to the ME 306. Alternate embodiments may use an IKE scenario or some other method to establish the RK. The RK serves as the security association between the CS and UIM 308.

In the AKA method, the RK is a secret shared between the CS, UIM and TTP. Therefore, as used herein, the AKA method implies that any security association between the CS and UIM implicitly includes the TTP. The inclusion of the TTP in any security association is not considered a breach of security, as the CS trusts the TTP not to assist in unauthorized access to the broadcast channel. As stated hereinabove, if a key is shared with the ME 306, it is desirable to change that key often. This is due to the risk of a non-subscriber accessing information stored in memory storage unit, MEM 310 and thus allowing access to a controlled or partially controlled service. The ME 306 stores SK (key information used for decrypting broadcast content) in memory storage unit, MEM 310. The CS must send sufficient information for subscribed users to compute SK. If the ME 306 of a subscribed user could compute SK from this information, then additional information required to compute SK cannot be secret. In this case, assume that the ME 306 of a non-subscribed user could also compute SK from this information. Hence, the value of SK must be computed in the SUPU 316, using a secret key shared by the CS and SUMU 314. The CS and SUMU 314 share the value of RK, however each user has a unique value of RK. There is insufficient time for the CS to encrypt SK with every value of RK and transmit these encrypted values to each subscribed user. Some other technique is required.

The following paragraphs discuss the subscription process in more detail. To ensure the efficient distribution of the security information SK, the CS periodically distributes a common Broadcast Access Key (BAK) to each subscriber UIM 308. For each subscriber the CS encrypts BAK using the corresponding RK to obtain a value called BAKI (BAK Information). The CS sends the corresponding BAKI to MS 300 of the subscribed user. For example, BAK may be transmitted as an IP packet encrypted using the RK corresponding to each MS. In the exemplary embodiment, the BAKI is an IPSec packet. In the exemplary embodiment, BAKI is an IPSec packet containing BAK that is encrypted using RK as the key. Since RK is a per-user key, the CS must send the BAK to each subscriber individually; thus, the BAK is not sent over the broadcast channel. The MS 300 passes the BAKI to the UIM 308. The SUPU 316 computes BAK using the value of RK stored in SUMU 314 and the value of BAKI. The value of BAK is then stored in the SUMU. In the exemplary embodiment, the BAKI contains a Security Parameter Index (SPI) value instructing the MS 300 to pass BAKI to the UIM 308, and instructing the UIM 308 to use the RK for decrypting the BAKI.

The period for updating the BAK is desired to be sufficient to allow the CS to send the BAK to each subscriber individually, without incurring significant overhead. Since the ME 306 is not trusted to keep secrets for a long time, the UIM 308 does not provide the BAK to the ME 306. The BAK serves as the security association between the CS and the group of subscribers of HSBS service.

The following paragraph discusses how the SK is updated following a successful subscription process. Within each period for updating the BAK, a short-term interval is provided during which SK is distributed on a broadcast channel. The CS uses a cryptographic function to determine two values SK and SKI (SK Information) such that SK can be determined from BAK and SKI. For example, SKI may be the encryption of SK using BAK as the key. In the exemplary embodiment, SKI is an IPSec packet containing SK that is encrypted using BAK as the key. Alternatively, SK may be the result of applying a cryptographic hash function to the concatenation of the blocks SKI and BAK.

Some portion of SKI may be predictable. For example, a portion of SKI may be derived from the system time during which this SKI is valid. This portion, denoted SKI_A, need not be transmitted to the MS 300 as part of the broadcast service. The remainder of SKI, SKI_B may be unpredictable. The SKI_B need not be transmitted to the MS 300 as part of the broadcast service. The MS 300 reconstructs SKI from SKI_A and SKI_B and provides SKI to UIM 308. The SKI may be reconstructed within the UIM 308. The value of SKI must change for each new SK. Thus, either SKI_A and/or SKI_B must change when computing a new SK. The CS sends SKI_B to BS for broadcast transmission. The BS broadcasts SKI_B, which is detected by the antenna 302 and passed to the receive circuitry 304. Receive circuitry 304 provides SKI_B to the MS 300, wherein the MS 300 reconstructs SKI. The MS 300 provides SKI to UIM 308, wherein the UIM 308 obtains the SK using the BAK stored in SUMU 314. The SK is then provided by UIM 308 to ME 306. The ME 306 stores the SK in memory storage unit, MEM 310. The ME 306 uses the SK to decrypt broadcast transmissions received from the CS.

In the exemplary embodiment, the SKI also contains a Security Parameter Index (SPI) value instructing the MS 300 to pass SKI to the UIM 308, and instructing the UIM 308 to use the BAK for decrypting the SKI. After decryption, the UIM 308 passes the SK to the ME 306, wherein ME 306 uses the SK to decrypt broadcast content.

The CS and BS agree on some criteria for when SKI_B is to be transmitted. The CS may desire to reduce the intrinsic monetary value in each SK by changing SK frequently. In this situation, the desire to change SKI_B data is balanced against optimizing available bandwidth. The SKI_B may be transmitted on a channel other than the broadcast channel. When a user "tunes" to the broadcast channel, the receive circuitry 304 obtains information for locating the broadcast channel from a "control channel." It may be desirable to allow quick access when a user "tunes" to the broadcast channel. This requires the ME 306 to obtain SKI within a short amount of time. The ME 306 will already know SKI_A, however, the BS must provide SKI_B to ME 300 within this short amount of time. For example, the BS may frequently transmit SKI_B on the control channel, (along with the information for locating the broadcast channel), or frequently transmit SKI_B on the broadcast channel. The more often that the BS "refreshes" the value of SKI_B, the faster the MS 300 can access the broadcast message. The desire to refresh SKI_B data is balanced against optimizing available bandwidth, as transmitting SKI_B data too frequently may use an unacceptable amount of bandwidth in the control channel or broadcast channel.

This paragraph discusses the encryption and transmission of the broadcast content. The CS encrypts the broadcast content using the current SK. The exemplary embodiment employs an encryption algorithm such as the Advanced Encryption Standard (AES)h Cipher Algorithm. In the exemplary embodiment, the encrypted content is then transported by an IPsec packet according to the Encapsulating Security Payload (ESP) transport mode. The IPsec packet also contains an SPI value that instructs the ME 306 to use the current SK to decrypt received broadcast content. The encrypted content is sent via the broadcast channel.

Receive circuitry 304 provides the RKI and BAKI directly to the UIM 308. Further, receive circuitry 304 provides the SKI_B to an appropriate part of the MS 300 where it is combined with SKI_A to obtain SKI. The SKI is provided to the UIM 308 by the relevant part of the MS 300. The UIM 308 computes RK from the RKI and A-key, decrypts the BAKI using the RK to obtain BAK, and computes the SK using the SKI and BAK, to generate an SK for use by the ME 306. The ME 306 decrypts the broadcast content using the SK. The UIM 308 of the exemplary embodiment is not sufficiently powerful for decryption of broadcast content in real time, and, therefore, SK is passed to the ME 306 for decrypting the broadcast content.

Figure 5:
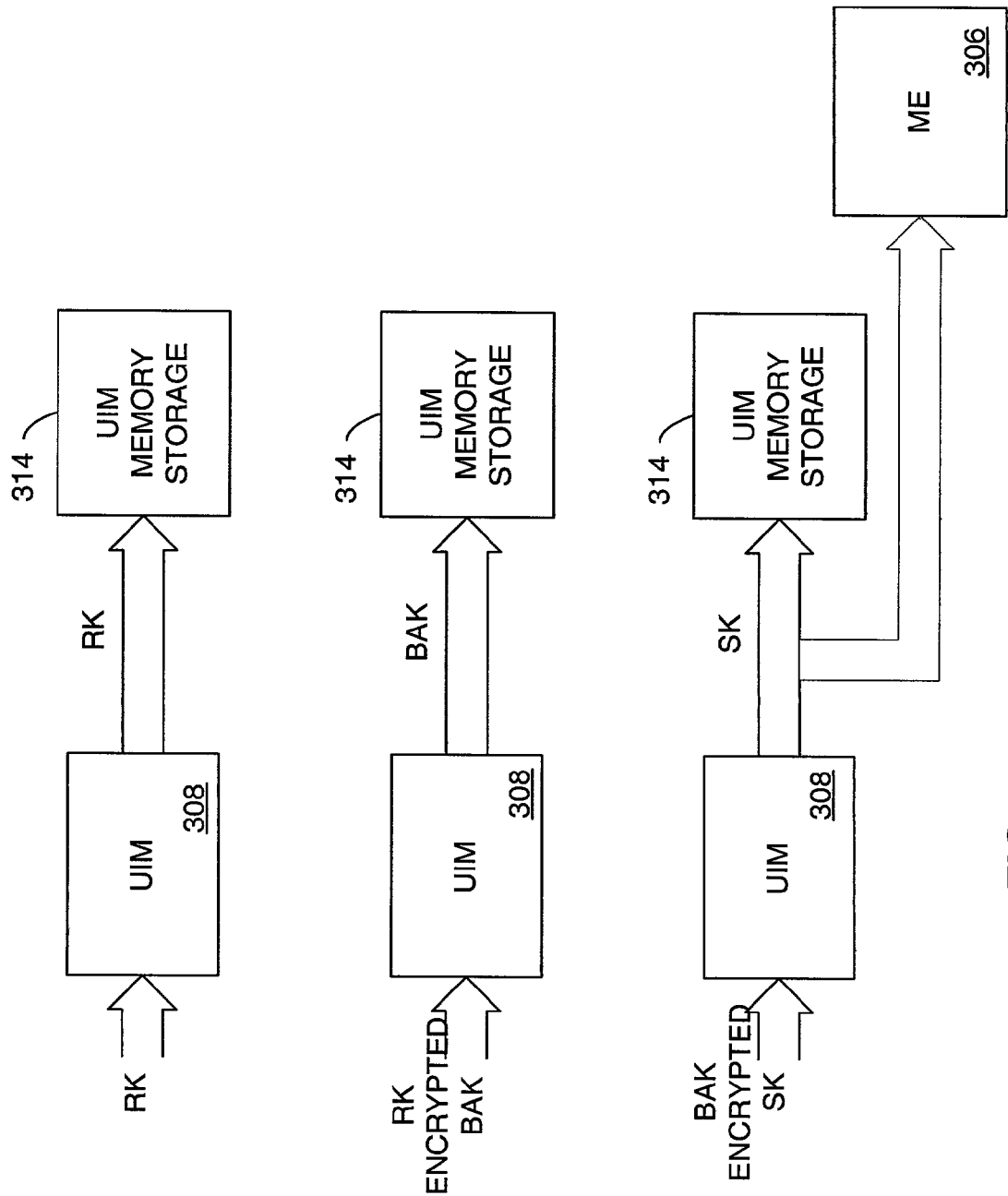
FIG. 5 is a model describing the updating of keys within a mobile station used for controlling broadcast access.

FIG. 5 illustrates the transmission and processing of keys RK, BAK and SK according to the exemplary embodiment. As illustrated, at registration the MS 300 receives the RKI and passes it to UIM 308, wherein the SUPU 316 computes RK using RKI and the A-key, and stores the RK in UIM memory storage SUMU 314. The MS 300 periodically receives the BAKI that contains BAK encrypted using the RK value specific to UIM 308. The encrypted BAKI is decrypted by SUPU 316 to recover the BAK, which is stored in UIM memory storage SUMU 314. The MS 300 further periodically receives an SKI_B that it combines with SKI_A to form SKI. The SUPU 316 computes SK from SKI and BAK. The SK is provided to ME 306 for decrypting broadcast content.

Figure 6:
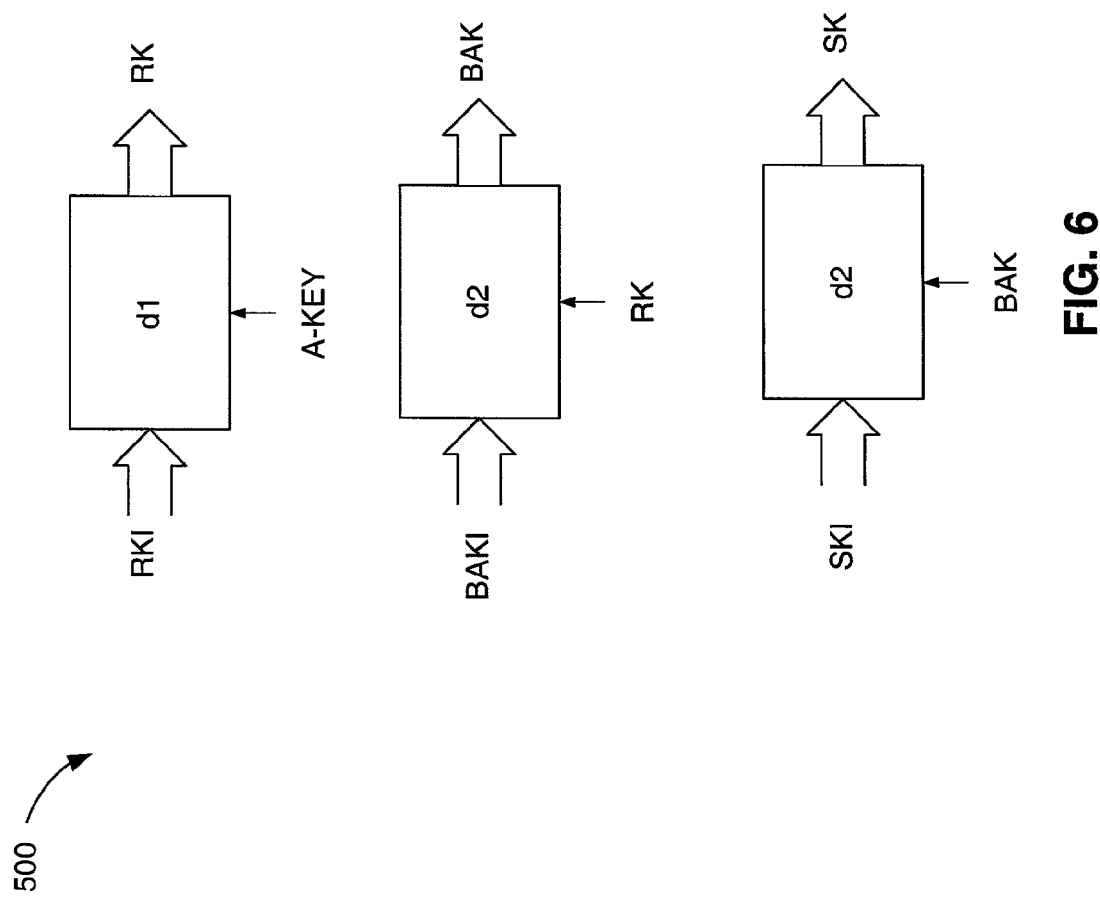
FIG. 6 is a model describing cryptographic operations within a UIM.

In the exemplary embodiment the CS keys are not necessarily encrypted and transmitted to the MSs; the CS may use an alternative method. The key information generated by the CS for transmission to each MS provides sufficient information for the MS to calculate the key. As illustrated in the system 350 of FIG. 6, the RK is generated by the CS, but RK Information (RKI) is transmitted to the MS. The CS sends information sufficient for the UIM to derive the RK, wherein a predetermined function is used to derive the RK from transmitted information from the CS. The RKI contains sufficient information for the MS to determine the original RK from the A_key and other values, such as system time, using a predetermined public function labeled d1, wherein:

$$RK = d1(A\text{-key}, RKI). \tag{3}$$

In the exemplary embodiment, the function d1 defines a cryptographic-type function. According to one embodiment, RK is determined as:

$$RK = SHA'(A\text{-key}\|RKI), \tag{4}$$

wherein "∥" denotes the concatenation of the blocks containing A-key and RKI, and SHA'(X) denotes the last 128-bits of output of the Secure Hash Algorithm SHA-1 given the input X. In an alternative embodiment, RK is determined as:

$$RK = AES(A\text{-key}, RKI), \tag{5}$$

wherein AES(X,Y) denotes the encryption of the 128-bit block RKI using the 128-bit A-key. In a further embodiment based on the AKA protocol, RK is determined as the output of the 3 GPP key generation function f3, wherein RKI includes the value of RAND and appropriate values of AMF and SQN as defined by the standard.

The BAK is treated in a different manner because multiple users having different values of RK must compute the same value of BAK. The CS may use any technique to determine BAK. However, the value of BAKI associated with a particular UIM 308 must be the encryption of BAK under the unique RK associated with that UIM 308. The SUPU 316 decrypts BAKI using RK stored in the SUMU 314 according to the function labeled d2, according to:

$$BAK = d2(BAKI, RK). \tag{9}$$

In an alternate embodiment, the CS may compute BAKI by applying a decryption process to BAK using RK, and the SUPU 316 obtains BAK by applying the encryption process to BAKI using RK. This is considered equivalent to the CS encrypting BAK and the SUPU 316 decrypting BAKI. Alternate embodiments may implement any number of key combinations in addition to or in place of those illustrated in FIG. 6.

The SK is treated in a similar manner to RK. First SKI is derived from the SKI_A and SKI_B (SKI_B is the information transmitted from CS to MS). Then a predetermined function labeled d3 is used to derive the SK from SKI and BAK (stored in the SUMU 314), according to:

$$SK = d3(BAK, SKI). \tag{6}$$

In one embodiment, the function d3 defines a cryptographic-type function. In an exemplary embodiment, SK is computed as:

$$SK = SHA(BAK\|SKI), \tag{7}$$

while in another embodiment, SK is computed as $$SK = AES(BAK, SKI). \tag{8}$$

Figure 7B:
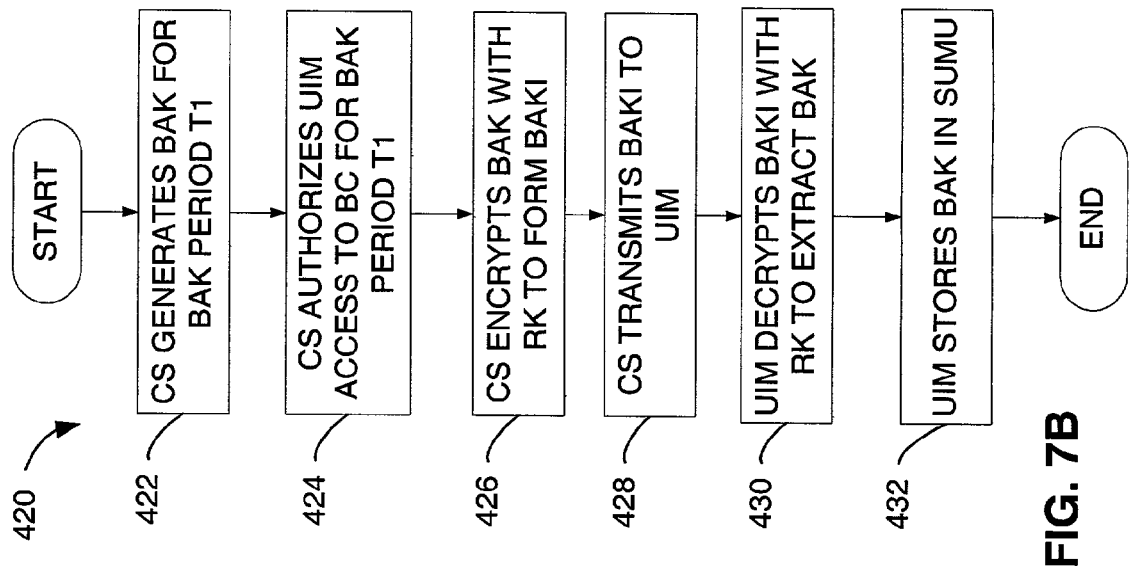
FIGS. 7A-7D illustrate a method of implementing security encryption in a wireless communication system supporting broadcast transmissions.
Figure 7A:
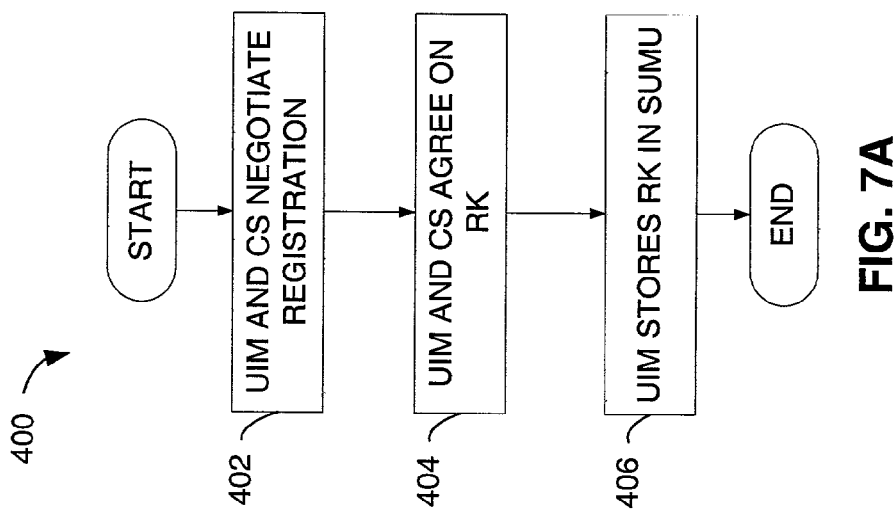

A method of providing the security for a broadcast message is illustrated in FIGS. 7A-7D. FIG. 7A illustrates a registration process 400 wherein a subscriber negotiates registration with the CS at step 402. The registration at step 404 provides the UIM a unique RK. The UIM stores the RK in a Secure Memory Unit (SUMU) at step 406. FIG. 7B illustrates subscription processing 420 between a CS and a MS. At step 422 the CS generates a BAK for a BAK time period T1. The BAK is valid throughout the BAK time period T1, wherein the BAK is periodically updated. At step 424 the CS authorizes the UIM to have access to the Broadcast Content (BC) during the BAK timer period T1. At step 426 the CS encrypts the BAK using each individual RK for each subscriber. The encrypted BAK is referred to as the BAKI. The CS then transmits the BAKI to the UIM at step 428. The UIM receives the BAKI and performs decryption using the RK at step 430. The decrypted BAKI results in the originally generated BAK. The UIM stores the BAK n a SUMU at step 432. The UIM then receives the broadcast session and is able to access the BC by applying the BAK to decryption of the encrypted broadcast (EBC).

Figure 7D:
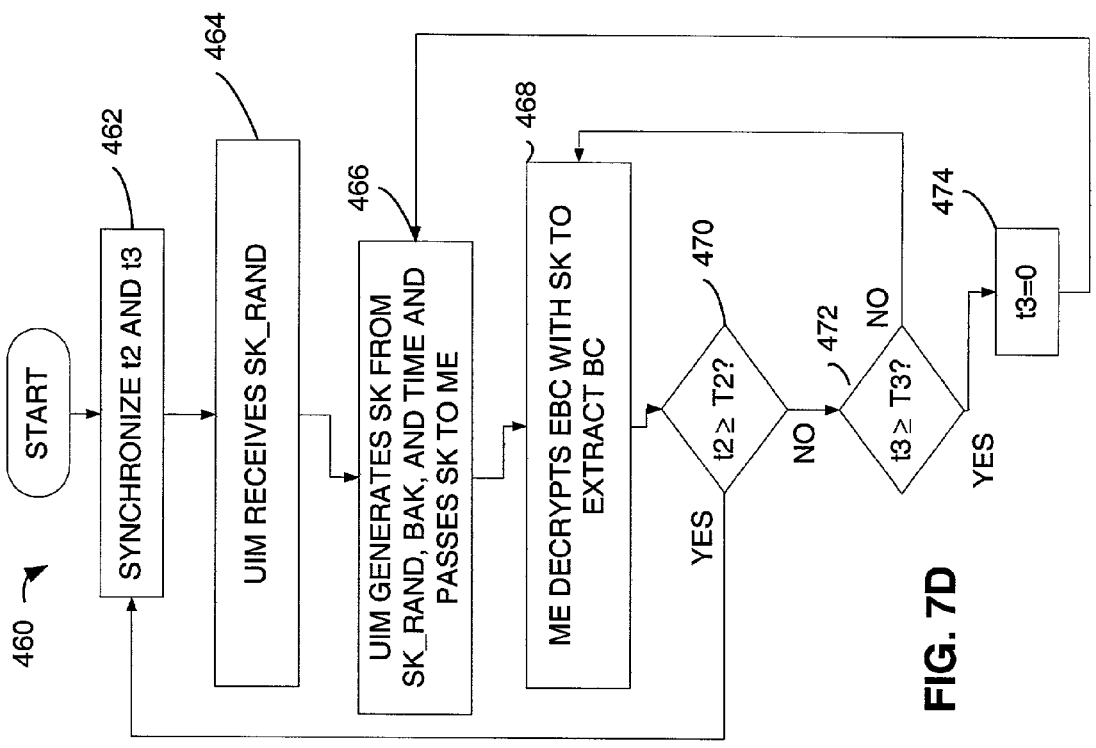
Figure 7C:
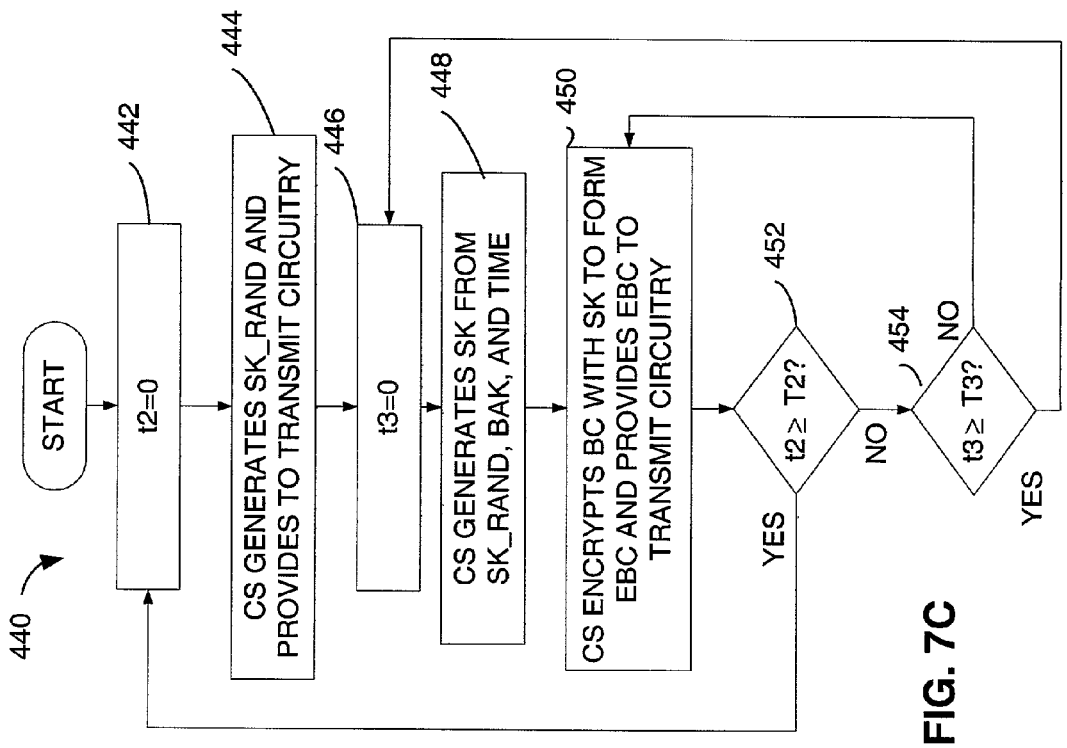
Figure 7E:
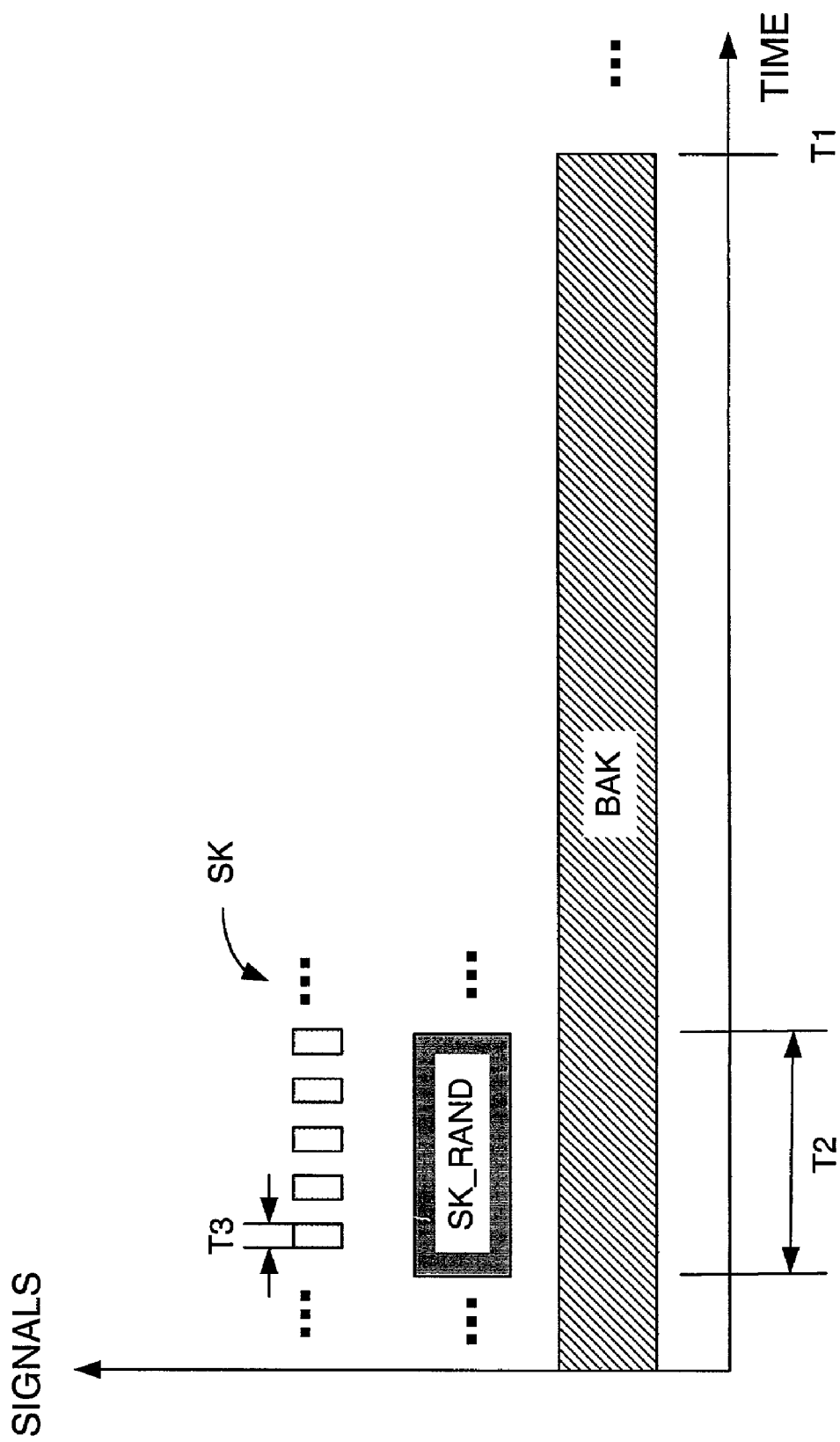
FIG. 7E is a timing diagram of key update periods of a security option in a wireless communication system supporting broadcast transmissions.

FIG. 7C illustrates a method of updating keys for security encryption in a wireless communication system supporting broadcast service. The method 440 implements time periods as given in FIG. 7E. The BAK is updated periodically having a time period T1. A timer t1 is initiated when BAK is calculated and times out at T1. A variable is used for calculating the SK referred to as SK_RAND, which is updated periodically having a time period T2. A timer t2 is initiated when the SK_RAND is generated and times out at T2. In one embodiment, the SK is further updated periodically having a period of T3. A timer t3 is initiated when each SK is generated and time out at time T3. The SK_RAND is generated at the CS and provided periodically to the MS. The MS and the CS use SK_RAND to generate the SK, as detailed hereinbelow.

A first timer t1 is reset when the applicable value of BAK is updated. The length of time between two BAK updates is the BAK update period. In the exemplary embodiment the BAK update period is a month, however, alternate embodiments may implement any time period desired for optimum operation of the system, or to satisfy a variety of system criteria.

Continuing with FIG. 7C, the method 440 initializes the timer t2 at step 442 to start the SK_REG time period T2. The CS generates SK_RAND and provides the value to transmit circuitry for transmission throughout the system at step 444. The timer t3 is initialized at step 446 to start the SK time period T3. The CS then encrypts the BC using the current SK at step 448. The encrypted product is the EBC, wherein the CS provides the EBC to transmit circuitry for transmission in the system. If the timer t2 has expired at decision diamond 450, processing returns to step 442. While t2 is less than T2, if the timer t3 has expired at decision diamond 452, processing returns to step 446; else processing returns to 450.

FIG. 7D illustrates the operation of the MS accessing a broadcast service. The method 460 first synchronizes the timers t2 and t3 with the values at the CS at step 462. The UIM of the MS receives the SK_RAND generated by the CS at step 464. At step 466 the UIM generates the SK using the SK_RAND, BAK, and a time measurement. The UIM passes the SK to the ME of the MS. The UIM then decrypts the received EBC using the SK to extract the original BC at step 468. When the timer t2 expires at step 470 processing returns to step 462. While the timer t2 is less than T2, if the timer t3 expires at step 472, the timer t3 is initialized at step 474 and returns to 466.

When the user subscribes to the broadcast service for a particular BAK update period, the CS sends the appropriate information BAKI (corresponding to the BAK encrypted with the RK). This typically occurs prior to the beginning of this BAK update period or when the MS first tunes to the broadcast channel during this BAK update period. This may be initiated by the MS or CS according to a variety of criteria. Multiple BAKI may be transmitted and decrypted simultaneously.

Note that when expiration of the BAK update period is imminent, the MS may request the updated BAK from the CS if the MS has subscribed for the next BAK update period. In an alternate embodiment the first timer t1 is used by the CS, where upon expiration of the timer, i.e., satisfaction of the BAK update period, the CS transmits the BAK.

Note that it is possible for a user to receive a BAK during a BAK update period, wherein, for example, a subscriber joins the service mid-month when the BAK updates are performed monthly. Additionally, the time periods for BAK and SK updates may be synchronized, such that all subscribers are updated at a given time.

Figure 8A:
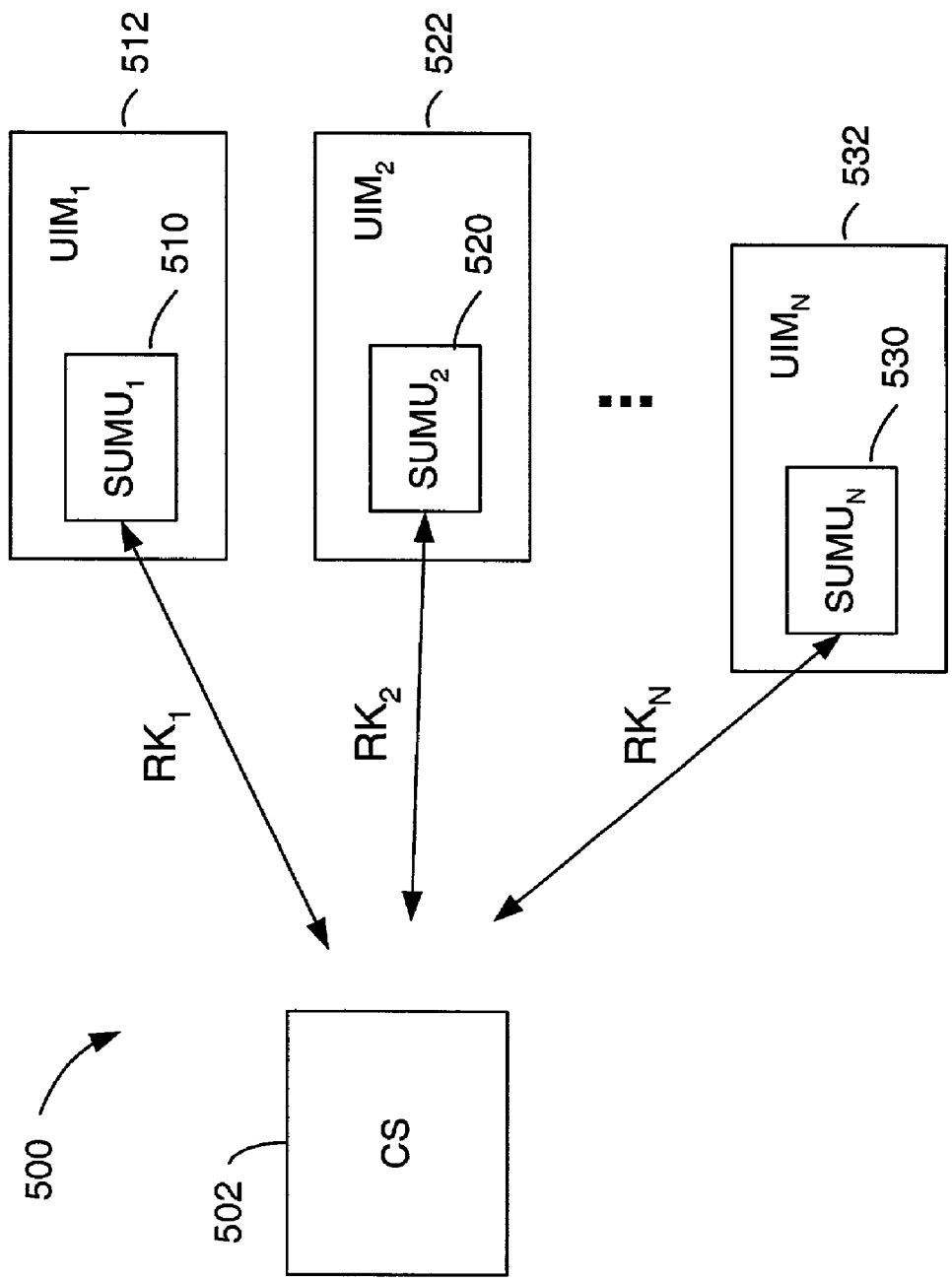
FIGS. 8A-8D illustrate application of a security encryption method in a wireless communication system supporting broadcast transmissions.

FIG. 8A illustrates the registration process in a wireless communication system 500 according to the exemplary embodiment. The CS 502 negotiates with each subscriber, i.e., MS 512, to generate a specific RK to each of the subscribers. The RK is provided to the SUMU unit within the UIM of each MS. As illustrated, the CS 502 generates $RK_1$ which is stored in $SUMU_1$ 510 within $UIM_1$ 512. Similarly, the CS 502 generates $RK_2$ and $RK_N$ which are stored in $SUMU_2$ 520 within $UIM_2$ 522 and $SUMU_N$ 530 within $UIM_N$ 532, respectively.

Figure 8B:
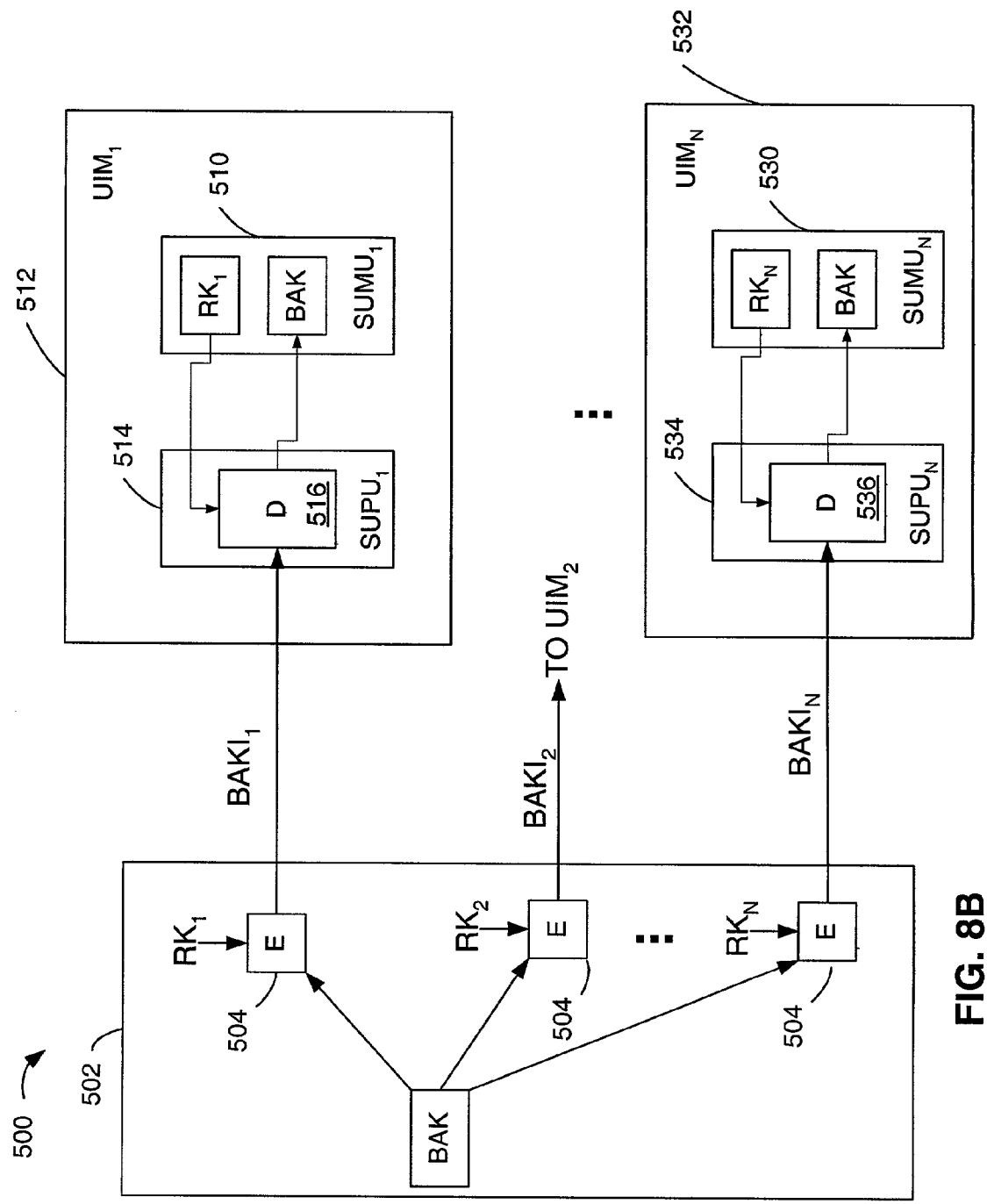

FIG. 8B illustrates the subscription process in the system 500. The CS 502 further includes multiple encoders 504. Each of the encoders 504 receives one of the unique RKs and the BAK value generated in the CS 502. The output of each encoder 504 is a BAKI encoded specifically for a subscriber. The BAKI is received at the UIM of each MS, such as $UIM_1$ 512. Each UIM includes a SUPU and a SUMU, such as $SUPU_1$ 514 and $SUMU_1$ 510 of $UIM_1$ 512. The SUPU includes a decoder, such as decoder 516 that recovers the BAK by application of the RK of the UIM. The process is repeated at each subscriber.

Figure 8C:
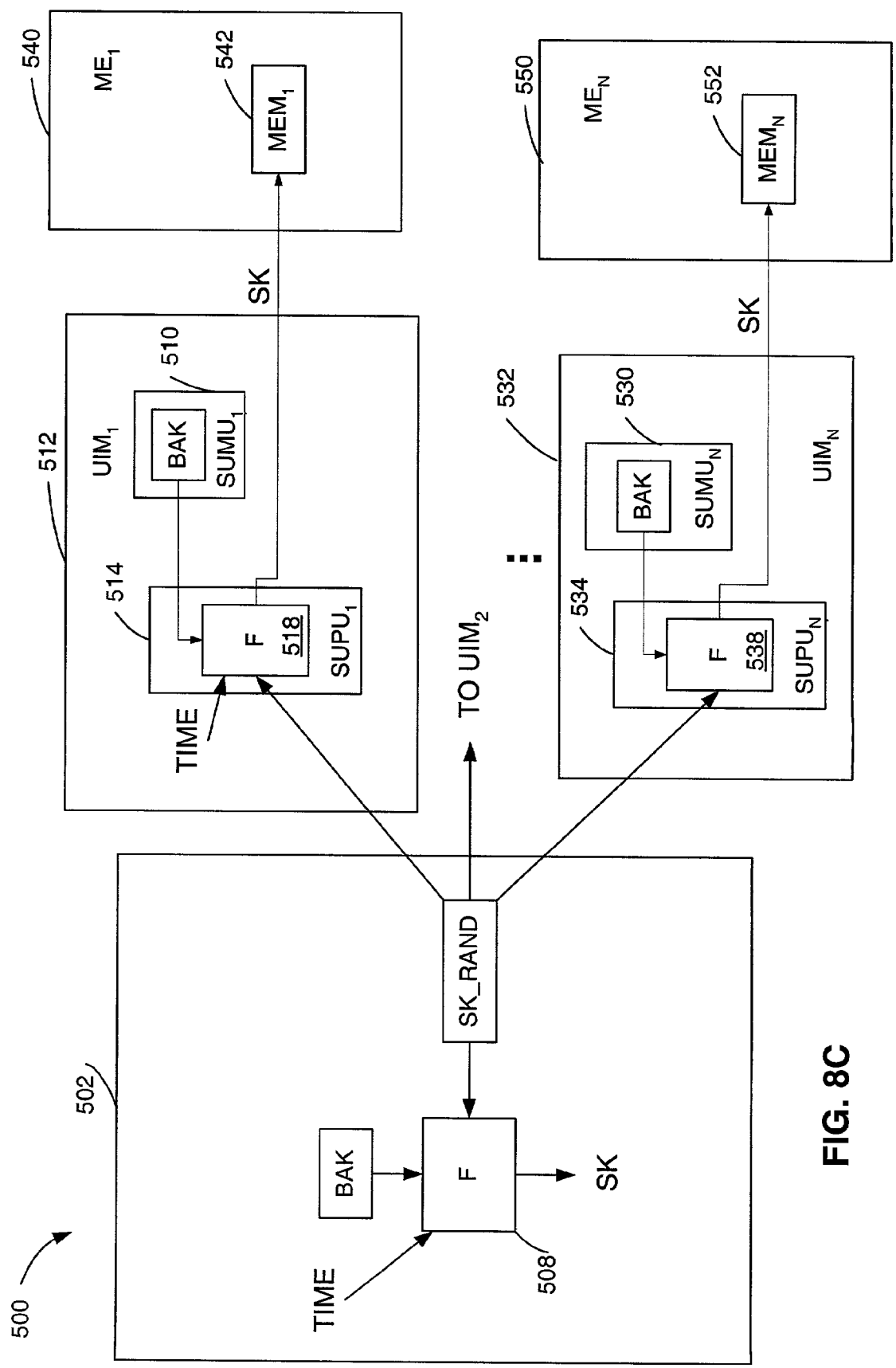

Key management and updates are illustrated in FIG. 8C, wherein the CS applies a function 508 to generate a value of SK_RAND, which is an interim value used by the CS and MS to calculate SK. Specifically, the function 508 applies the BAK value, the SK_RAND and a time factor. While the embodiment illustrated in FIG. 8C applies a timer to determine when to update the SK, alternate embodiments may use alternate measures to provide periodic updates, for example occurrence of an error or other event. The CS provides the SK_RAND value to each of the subscribers, wherein a function 518 resident in each UIM applies the same function as in function 508 of the CS. The function 518 operates on the SK_RAND, BAK and a timer value to generate a SK that is stored in a memory location in the ME, such as $MEM_1$ 542 of $ME_1$ 540.

Figure 8D:
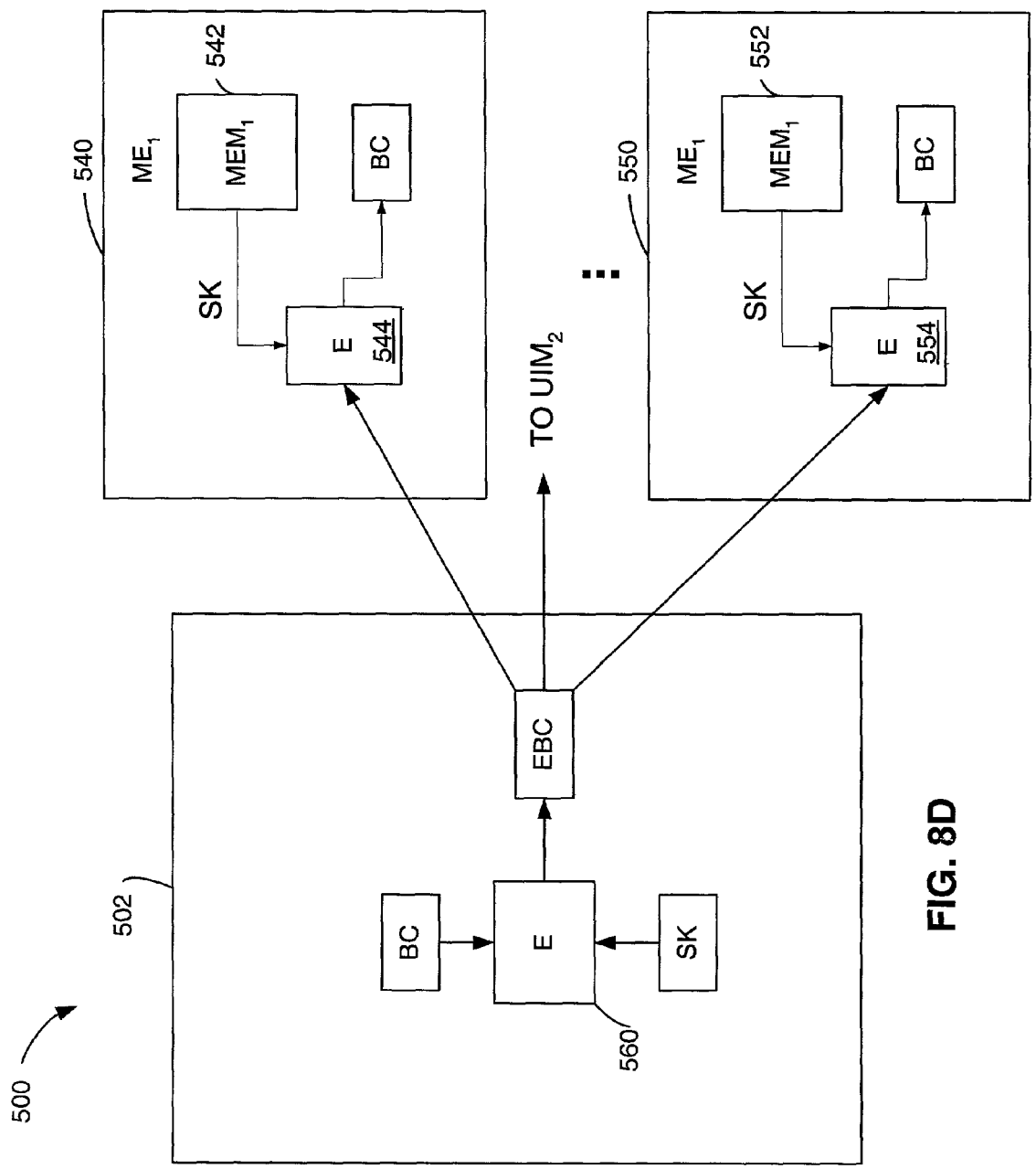

FIG. 8D illustrates the processing of BC after registration and subscription. The CS 502 includes an encoder 560 that encodes the BC using the current SK to generate the EBC. The EBC is then transmitted to the subscribers. Each MS includes an encoder, such as encoder 544, that extracts the BC from the EBC using the SK.

While the present invention has been described with respect to an exemplary embodiment of a wireless communication system supporting a unidirectional broadcast service, the encryption methods and key management described hereinabove is further applicable to other data processing systems, including a multi-cast type broadcast system. Still further, application of the present invention to any data processing system wherein multiple subscribers access a single transmission of secure information through an insecure channel.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for secure transmissions, the method comprising:
determining a registration key specific to a mobile station participating in a transmission;
determining a first key;
encrypting the first key with the registration key;
sending the encrypted first key to the mobile station participating in the transmission;
determining a second key for decrypting content on a broadcast channel;
updating the first key after a first time period has elapsed; and
updating the second key after a second time period has elapsed, wherein the updated second key is determined based on two parts, a first part comprising the updated first key and a second part based on information sent on the broadcast channel, and wherein the first part and the second part are concatenated to determine the updated second key using a cryptographic function.

2. The method as in claim 1, wherein the second time period is less than the first time period.

3. The method as in claim 2, wherein updating the first key further comprises encrypting an updated first key with the registration key.

4. The method as in claim 3, further comprising:
calculating a registration key information message; and
transmitting the registration key information message.

5. The method as in claim 4, further comprising:
calculating a first key information message corresponding to the updated first key; and
transmitting the first key information message.

6. The method as in claim 5, further comprising:
determining a second key information message corresponding to the updated second key; and
transmitting the second key information message.

7. The method as in claim 2, further comprising:
encrypting a broadcast stream of information using the second key; and
transmitting the encrypted broadcast stream of information.

8. The method as in claim 7, wherein the broadcast stream of information comprises video information.

9. The method as in claim 7, wherein the broadcast stream of information comprises Internet Protocol packets.

10. The method as in claim 1, further comprising:
transmitting the encrypted first key.

11. The method as in claim 1, wherein the second part is further based on a time value.

12. The method as in claim 11, wherein the time value is not sent on the broadcast channel.

13. The method as in claim 1, wherein the updated second key is determined by applying a cryptographic hash function to the concatenation of the first and second parts.

14. A method for secure reception of a transmission, the method comprising:
receiving a registration key specific to a mobile station participating in a transmission;
receiving, at the mobile station, a first key encrypted with the registration key;
decrypting the first key with the registration key;
determining a second key using a cryptographic function and the first key, for decrypting content on a broadcast channel;
receiving a broadcast stream of information;
decrypting the broadcast stream of information using the second key;
receiving an updated first key after a first time period has elapsed; and
determining an updated second key after a second time period has elapsed, wherein the updated second key is determined based on two parts, a first part comprising the updated first key and a second part based on information sent on the broadcast channel, and wherein the first part and the second part are concatenated to determine the updated second key using a cryptographic function.

15. The method as in claim 14, further comprising:
storing the first key in a secure memory storage unit; and
storing the second key in a memory storage unit.

16. The method as in claim 14, further comprising:
recovering the updated first key from a first key information message; and
determining the updated second key using a second key information message.

17. The method as in claim 14, wherein the second part is further based on a time value.

18. The method as in claim 17, wherein the time value is not sent on the broadcast channel.

19. The method as in claim 14, wherein the updated second key is determined by applying a cryptographic hash function to the concatenation of the first and second parts.

20. In a wireless communication system supporting a broadcast service option, an infrastructure element comprising:
- a receive circuitry adapted to receive a registration key specific to a mobile station participating in a transmission, receive a first key encrypted with the registration key, receive an updated first key after a first time period has elapsed, and receive a second part for updating a short-time key after a second time period has elapsed;
- a user identification unit, operative to determine an updated short-time key for decrypting a broadcast message, wherein the short-time key is determined based on two parts, a first part comprising the updated first key and the second part based on information sent on the broadcast channel, and wherein the first part and the second part are concatenated to determine the updated short-time key using a cryptographic function, comprising:
  - processing unit operative to decrypt and to determine key information;
  - memory storage unit for storing a registration key; and
  - a mobile equipment unit adapted to apply the short-time key for decrypting the broadcast message.

21. The infrastructure element as in claim 20, wherein the short-time key is processed by the user identification unit and passed to the mobile equipment unit.

22. The infrastructure element as in claim 20, wherein the memory storage unit is a secure memory storage unit.

23. The infrastructure element as in claim 20, wherein the memory storage unit stores a broadcast access key comprising the first key, and wherein the processing unit determines the short-time key using the broadcast access key.

24. The infrastructure element as in claim 23, wherein the short-time key is updated at a first frequency.

25. The infrastructure element as in claim 24, wherein the broadcast access key is updated at a second frequency less than the first frequency.

26. The infrastructure element as in claim 20, wherein the broadcast service option is a video service.

27. The infrastructure element as in claim 20, wherein the second part is further based on a time value.

28. The infrastructure element as in claim 27, wherein the time value is not sent on the broadcast channel.

29. The infrastructure element as in claim 20, wherein the updated short-time key is determined by applying a cryptographic hash function to the concatenation of the first and second parts.

30. A wireless communication system, comprising:
- means for determining a registration key specific to a mobile station participating in a transmission;
- means for determining a first key;
- means for encrypting the first key with the registration key;
- means for sending the encrypted first key to the mobile station participating in the transmission;
- means for determining a second key for decrypting content on a broadcast channel;
- means for updating the first key after a first time period has elapsed; and
- means for updating the second key after a second time period has elapsed, wherein the updated second key is determined based on two parts, a first part comprising the updated first key and a second part based on information sent on the broadcast channel, and wherein the first part and the second part are concatenated to determine the updated second key using a cryptographic function.

31. The wireless communication system as in claim 30, wherein the second part is further based on a time value.

32. The wireless communication system as in claim 31, wherein the time value is not sent on the broadcast channel.

33. The wireless communication system as in claim 30, wherein the updated second key is determined by applying a cryptographic hash function to the concatenation of the first and second parts.

34. An infrastructure element, comprising:
- means for receiving a registration key specific to a mobile station participating in a transmission;
- means for receiving a first key encrypted with the registration key;
- means for decrypting the first key with the registration key;
- means for determining a second key using a cryptographic function and the first key, for decrypting content on a broadcast channel;
- means for receiving a broadcast stream of information;
- means for decrypting the broadcast stream of information using the second key;
- means for updating the first key after a first time period has elapsed; and
- means for updating the second key after a second time period has elapsed, wherein the updated second key is determined based on two parts, a first part comprising the updated first key and a second part based on information sent on the broadcast channel, and wherein the first part and the second part are concatenated to determine the updated second key using a cryptographic function.

35. The infrastructure element as in claim 34, wherein the second part is further based on a time value.

36. The infrastructure element as in claim 35, wherein the time value is not sent on the broadcast channel.

37. The infrastructure element as in claim 34, wherein the updated second key is determined by applying a cryptographic hash function to the concatenation of the first and second parts.

38. A digital storage device storing instructions, said instructions comprising:
- first set of instructions for receiving a registration key specific to a mobile station participating in a transmission;
- second set of instructions for receiving a first key encrypted with the registration key;
- third set of instructions for decrypting the first key with the registration key;
- fourth set of instructions for determining a second key using a cryptographic function and the first key, for decrypting content on a broadcast channel;
- fifth set of instructions for receiving the broadcast stream of information;
- sixth set of instructions for decrypting the broadcast stream of information using the second key; and
- seventh set of instructions for updating the first key after a first time period has elapsed, updating the second key after a second time period has elapsed, wherein the updated second key is determined based on two parts, a first part comprising the updated first key and a second part based on information sent on a broadcast channel, and wherein the first part and the second part are con catenated to determine the updated second key using a cryptographic function.

39. The digital storage device as in claim 38, wherein the second part is further based on a time value.

40. The digital storage device as in claim 39, wherein the time value is not sent on the broadcast channel.

41. The digital storage device as in claim 38, wherein the updated second key is determined by applying a cryptographic hash function to the concatenation of the first and second parts.

* * * * *